(12) United States Patent
Sasaki et al.

(10) Patent No.: US 6,540,167 B2
(45) Date of Patent: Apr. 1, 2003

(54) TAKE UP ASSEMBLY DOOR MECHANISM

(75) Inventors: Makoto Sasaki, Kawasaki (JP); Christopher F. Banks, Rollinsville, CO (US); Yukio Katsuyama, Kawasaki (JP); Akira Takano, Yokohama (JP); Tsukasa Minemura, Nagano (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/774,355

(22) Filed: Jan. 30, 2001

(65) Prior Publication Data
US 2002/0100829 A1 Aug. 1, 2002

Related U.S. Application Data
(60) Provisional application No. 60/250,188, filed on Nov. 29, 2000.

(51) Int. Cl.[7] .............................................. G11B 15/66
(52) U.S. Cl. .............................. 242/332.4; 242/332.7; 242/348.2; 360/95; 360/132
(58) Field of Search .......................... 242/332.4, 332.7, 242/332.8, 348.2, 532.1, 532.6, 532.7, 582; 360/95, 132

(56) References Cited

U.S. PATENT DOCUMENTS

| | | | |
|---|---|---|---|
| 4,467,983 A | 8/1984 | Ledun | |
| 4,477,851 A | * 10/1984 | Dalziel et al. | 242/332.4 |
| 4,572,460 A | 2/1986 | Hertrich | |
| 4,646,177 A | 2/1987 | Sanford et al. | 360/95 |
| 4,674,702 A | 6/1987 | Lenoble et al. | |
| 5,979,813 A | 11/1999 | Mansbridge et al. | 242/332.4 |
| 6,398,142 B1 | * 6/2002 | Kletzl et al. | 242/332.4 |

* cited by examiner

Primary Examiner—William A. Rivera
(74) Attorney, Agent, or Firm—Sheridan Ross P.C.

(57) ABSTRACT

A control mechanism for loading/unloading data storage tape is provided. The control mechanism is part of a tape drive that receives a removable tape cartridge. The tape cartridge stores the data storage tape that is movable using the control mechanism. The control mechanism includes a plurality of gears, together with a cam. A leader assembly is operably connected to the control mechanism. At least portions of the leader assembly are movable in connection with loading or unloading the data storage tape relative to the leader assembly. A leader pin is joined to an end of the data storage tape. When the loading operation is performed, portions of the leader assembly are moved generally linearly into the tape cartridge and then the control mechanism causes such portions to pivot in order to engage the leader pin and remove it from its seat. When the unloading operation is performed, the portions of the leader assembly are moved in substantially opposite directions from the loading operation.

19 Claims, 25 Drawing Sheets

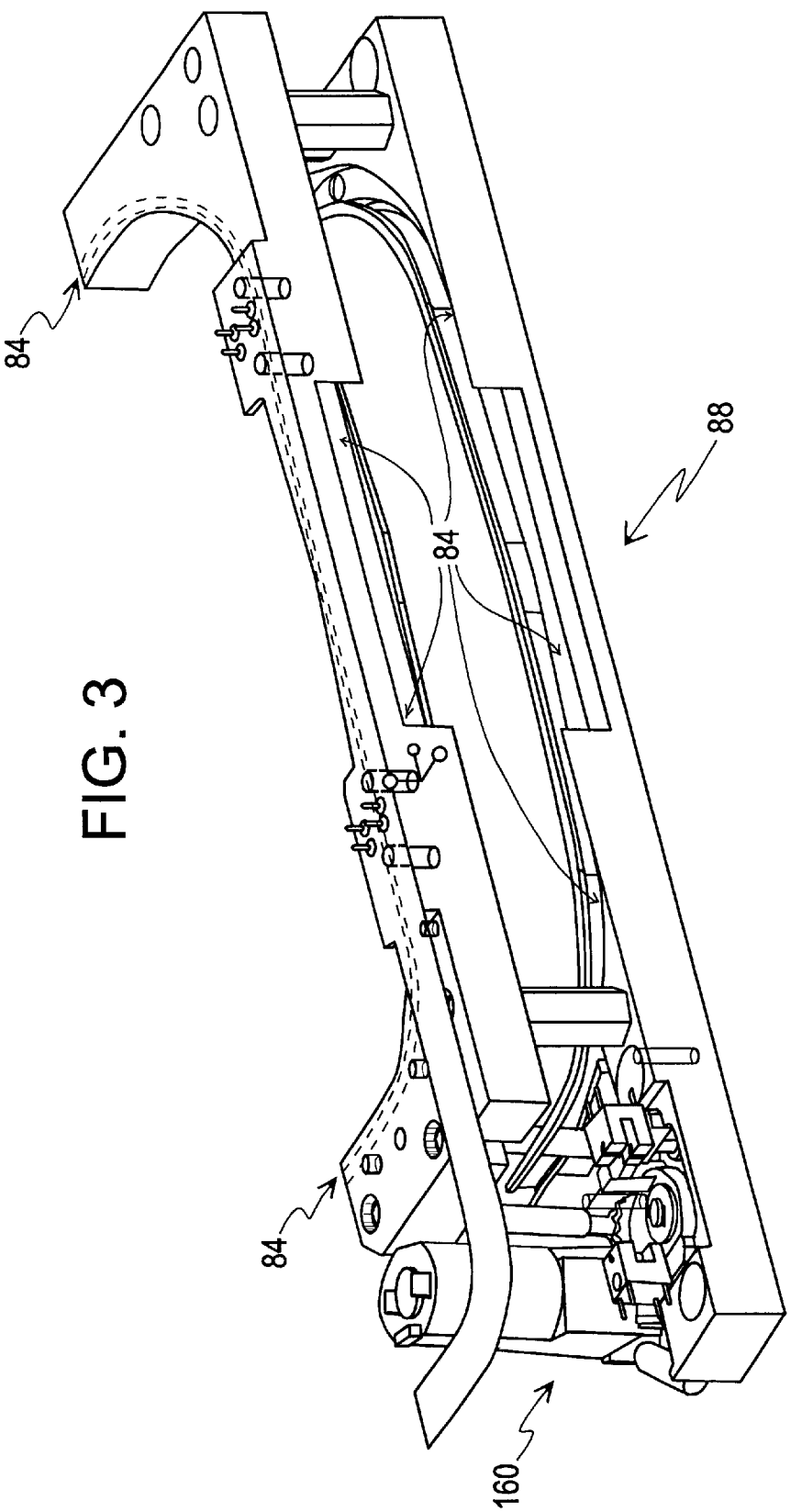

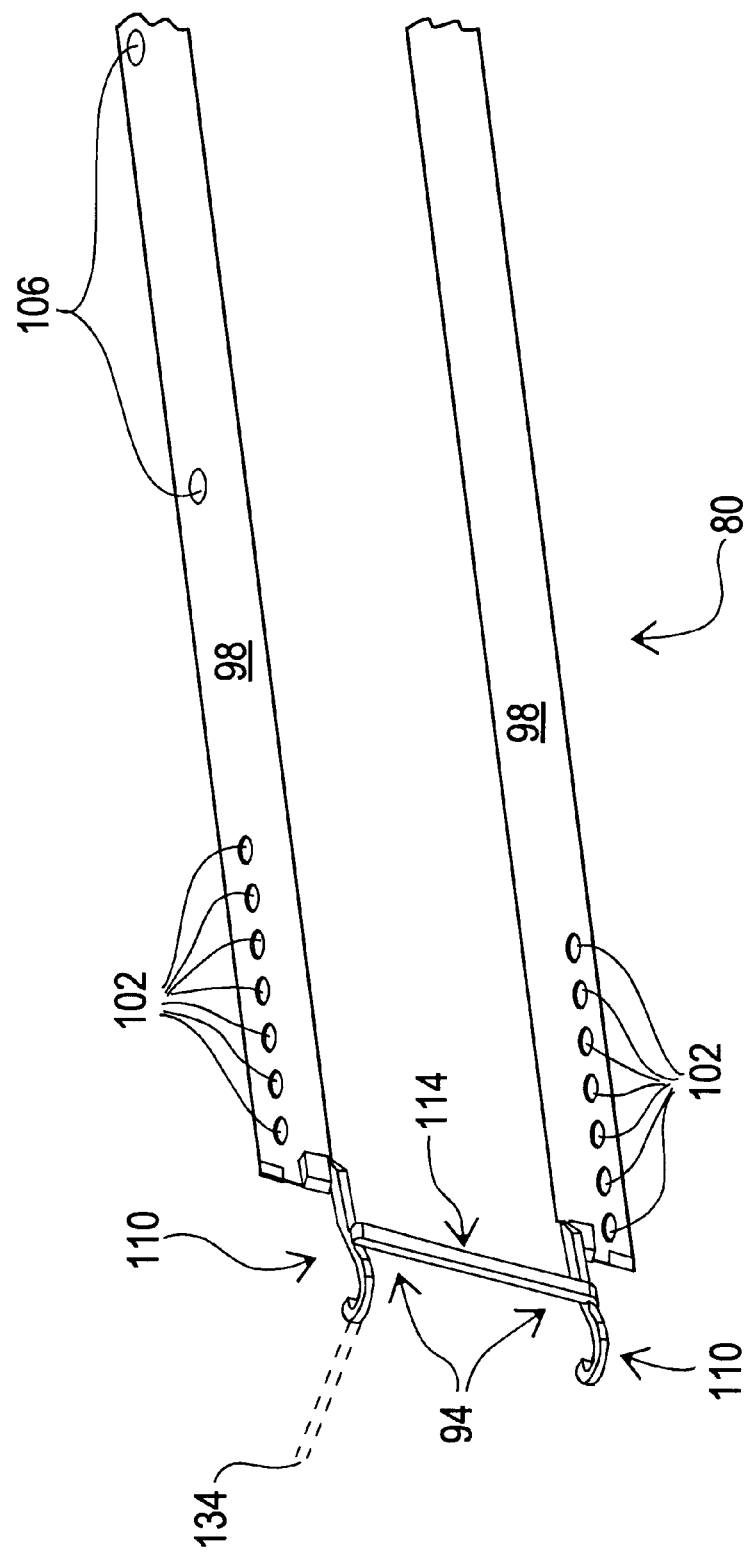

TAKE UP ASSEMBLY DOOR MECHANISM

RELATED APPLICATIONS

The present application claims priority from prior U.S. Provisional Patent Application Serial No. 60/250,188 filed Nov. 29, 2000 which is fully incorporated herein by reference. This application relates to application Ser. No. 09/774, 356, filed Jan. 30, 2001, and application Ser. No. 09/774, 380, filed Jan. 30, 2001.

FIELD OF THE INVENTION

The present invention relates to a tape system that can include a tape drive and a tape cartridge for housing data storage tape and, in particular, to a tape drive that includes a control mechanism for attaching/detaching at least one leader band to/from the data storage tape.

BACKGROUND OF THE INVENTION

Tape drives having a single tape reel use removable tape cartridges for obtaining the tape upon which and from which such tape drives write/read data. In particular, each of the tape cartridges used by such a tape drive has a complementary tape reel therein upon which the tape resides when not being operatively used in conjunction with the tape drive. In order to protect the tape and the data thereon from damage, the tape within each cartridge is not intended to be accessible except by the tape drive. Accordingly, the tape drive must include a mechanism for automatically threading the tape through the tape drive between the tape cartridge and the single reel of the tape drive. Various techniques have been used to perform such automatic threading. In connection with designing such tape drives, certain technical challenges have been identified that are commonly addressed, namely:

(a) The mechanism for pulling the tape through the tape drive is frequently unreliable in that, e.g., the tape drive threading components used for engaging with the free end of the tape during the threading of the tape by the tape drive do not engage reliably. Similarly, the tape drive components may also fail to disengage from the tape during the unthreading of the tape from the tape drive. Thus, the tape drive may fail to access the tape in some cartridges and/or a tape cartridge may become stuck within the tape drive.

(b) Once the free end of the tape has been secured for threading to, e.g., what is known in the art as a "leader band" (or simply "leader"), the tape free end may inadvertently disengage from the leader band during threading and/or become misaligned and fail to fully thread thus potentially damaging the tape drive.

(c) Due to the flexibility and thinness of many tapes currently used for data storage, the free end of the tape itself is not typically grasped (ungrasped) during threading (unthreading) operations. Instead, an appendage is provided on the free end of the tape, wherein this appendage is more readily grasped (ungrasped). Such an appendage may include a substantially rigid cylindrical, semicircular or other shaped component having a thickness substantially greater than the thickness of the tape. Alternatively, the appendage may include a slot for mating with an end portion of the leader band. In all such cases, the resulting coupling of the tape free end and the leader band is substantially thicker than the tape itself. Thus, when this substantially thicker coupling portion winds about the single reel of the tape drive, a non-smooth surface results which can compromise the data encoded on the tape that is subsequently wound on top of the non-smooth surface.

Although solutions to these technical issues have been advanced, it remains desirable to provide a tape drive that overcomes or alleviates them in an efficient manner. Such solutions should avoid complex mechanical configurations, be cost effective and reliable.

SUMMARY OF THE INVENTION

In accordance with the present invention, a tape system is provided that includes a take up assembly for winding/unwinding magnetic or other data storage tape. The tape system also includes a leader assembly to which the data storage tape is releasably joined. The tape system further includes a load/unload control mechanism that functions to attach/detach the leader assembly to/from the tape.

The load/unload control mechanism engages at least portions of the leader assembly to cause desired movement thereof in conjunction with tape loading/unloading relative to the removably held tape cartridge. In that regard, the control mechanism is used in moving the leader assembly in at least two directions when loading or joining the leader assembly to the storage tape. In one embodiment, the control mechanism causes the portions of the leader assembly to move in a first direction that is generally a straight movement from the tape drive to the tape cartridge. And a pivotal movement is then caused to occur, preferably in a clockwise direction, for positioning the leader assembly to engage the storage tape. More specifically, the storage tape has a pin held adjacent to its free end. The leader assembly includes at least a first leader band and a connector subassembly. In one embodiment, the leader assembly has first and second leader bands. The connector subassembly can include a pair of hooks interconnected by a hook stay. In this embodiment, when loading the data storage tape, the control mechanism causes upper portions of at least the first leader band and the hook subassembly to move into the tape cartridge and then pivot clockwise. When necessary or desired, the hook subassembly and the upper portions of the at least first leader band are then moved in a substantially straight direction towards the exit of the tape cartridge. In so doing, the hooks engage the tape pin and remove it from its seat as the hook subassembly and the upper portions of the first leader band move to exit the tape cartridge.

Comparable opposite directional movements are caused to occur when the storage tape is detached from the leader assembly (unloading operation). In particular, the leader assembly holding the tape pin moves into the tape cartridge and continues in a generally linear direction. During this movement, the tape pin seat for holding the tape pin in the tape cartridge is encountered. After the tape pin seat receives the tape pin, the hook subassembly and upper portions of the first leader band are caused to move in a counterclockwise direction. Alternatively, if desired or appropriate, after release of the tape pin in the tape pin seat, the leader assembly may continue for a short distance in the generally straight direction and then pivot counterclockwise. After the counterclockwise movement, the leader assembly is caused to move without the tape pin in the opposite generally linear direction towards and out of the tape cartridge.

The control mechanism for causing such loading/unloading movements can include a number of gears. These gears might include a drive gear, which is attached to a shaft of a motor. The gears can also include a planetary gear that meshes with the drive gear. A sprocket gear can also be provided to rotate one or more sprockets. Such a sprocket will engage holes in the first leader band, for example. A cam gear may also be utilized for use in rotating a cam. The cam movement is useful in causing the pivoting movement of the hook subassembly.

The planetary gear is selectively meshable with either the sprocket gear or the cam gear. When moving the leader assembly in the generally linear directions, the planetary gear meshes with the sprocket gear, and not the cam gear, so that when the planetary gear is driven, the sprocket gear causes the one or more sprockets to move the leader assembly in the generally linear directions. When a planetary gear meshes with the cam gear, and not the sprocket gear, the cam is caused to rotate to achieve the selected rotational or pivotal movement.

With regard to achieving the selective engagements between the planetary gear and the sprocket gear and between the planetary -ear and the cam gear, the control mechanism can include a pivotal arm. When the motor is driven clockwise, the pivotal arm rotates clockwise. When the motor is driven counterclockwise, the arm rotates counterclockwise. When the arm rotates clockwise, it disengages the planetary gear from the sprocket gear and engages with the cam gear. When the arm rotates counterclockwise, the planetary gear is disengaged from the cam bear and engaged with the sprocket gear.

The control mechanism preferably also includes a biasing device, such as a spring. The spring is operably connected to other portions of the control mechanism. The spring is preferably biased to allow or enable at least portions of the control mechanism to pivot in a counterclockwise direction. Consequently, when the leader assembly is caused to pivot in the clockwise direction, the force of the spring must be overcome during such pivotal movement.

Although the control mechanism can be used with any number of different configurations, in a preferred embodiment, the take up assembly includes a take up reel hub having at least a first take up reel connected to and spaced from the take up reel hub. In an even more preferred embodiment, first and second take up reels are provided, with the take up reel hub located intermediate thereof. The take up reel hub has a circumferential surface about which the magnetic tape winds and unwinds. Each of the one or both take up reels has a leader band wound thereabout. Because of the spaced, separate take up reel or reels, there is no overlap or contact between the leader bands and the magnetic tape.

Based on the foregoing summary, a number of advantages of the present invention are readily discerned. A reliable tape loading/unloading control mechanism is provided. The control mechanism causes different movements in order to enter the tape cartridge and either access or release a tape pin. A reduced number and efficient use of parts are achieved in the control mechanism design. In that regard, a unique arrangement and operation of a number of driven gears and a cam are provided. The control mechanism controls desired movement of both an elongated storage tape and a connector subassembly, in the form of a pair of hooks, into and out of a tape cartridge. In one embodiment, the leader assembly with which the control mechanism functions has first and second leader bands spaced from but connected to each other using the hook subassembly. In another or the same embodiment, the take up assembly has separate parts for winding/unwinding the storage tape and winding/unwinding one or more leader bands.

Additional advantages of the present invention will become readily apparent from the following discussion, particularly when taken together with the accompanying drawings.

BRIEF DESCRIPTION OF THE DRAWINGS

FIG. 3 is a schematic view of a tractor assembly for use in moving the leader assembly;

FIG. 5 is an enlarged, fragmentary, perspective view of the leader assembly including first and second leader bands and the connector subassembly;

DETAILED DESCRIPTION

Figure 1:
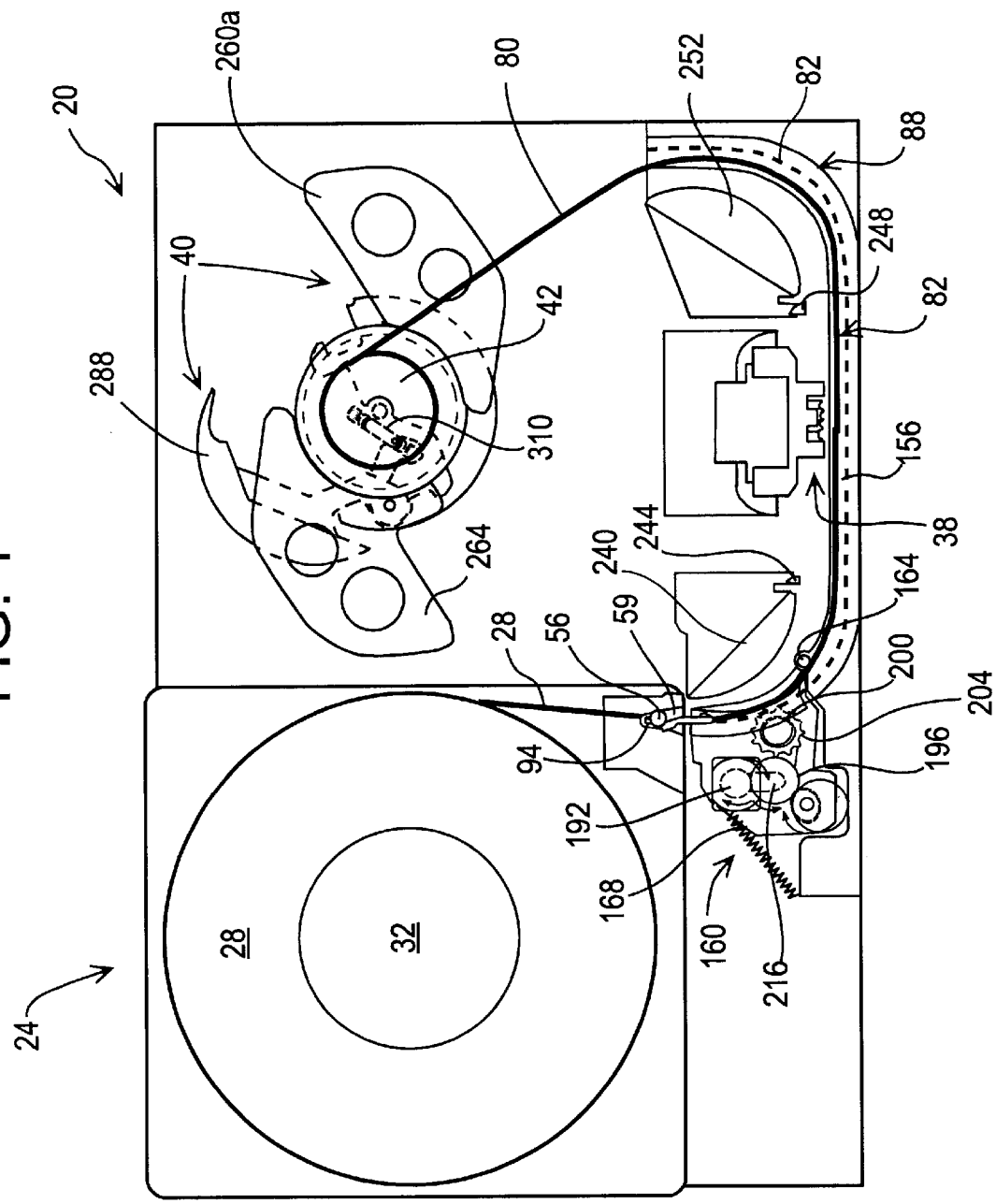
FIG. 1 schematically illustrates a tape cartridge removably held by a tape drive that includes a control mechanism for positioning a leader assembly adjacent to a leader pin.

FIG. 1 shows an embodiment of the present invention in the context of a single reel magnetic tape drive 20. In particular, FIG. 1 shows the tape drive 20 with a tape cartridge 24 positioned within the tape drive wherein magnetic or other data storage tape 28 is wound around the cartridge hub 32. However, during operation, the magnetic tape 24 is automatically threaded through the tape drive 20, over the read/write head 38 (for reading from and/or writing to the tape) and subsequently wound on the take up assembly 40, and more particularly, wound around the take up reel hub 42.

Figure 2:
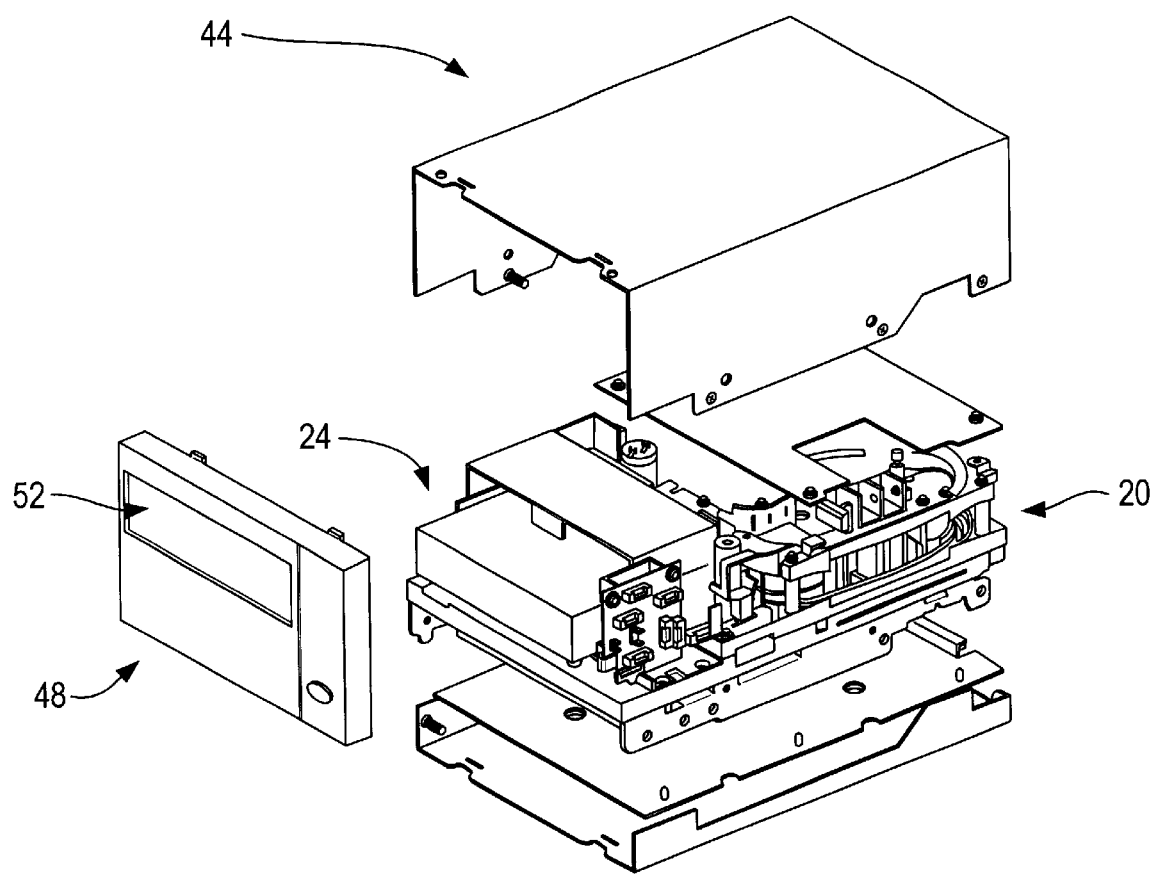
FIG. 2 is a perspective view illustrating assemblies and parts of the tape drive.

To provide a better appreciation as to the relationship between various components of the present invention and the tape cartridge 24, reference is made to FIG. 2 wherein a partially exploded view of a tape drive assembly 44 is provided having both the tape drive 20 and the tape cartridge 24 therein. Moreover, this figure shows the tape cartridge 24 operably positioned adjacent to the tape drive 20 for reading and/or writing of the tape 28. Note that the tape drive assembly 44 includes a front panel 48 with a door 52 covering an opening for entry and exit of the tape cartridge 24 from the tape drive assembly 44. Thus, the tape drive assembly 44 is designed to accept tape cartridges 24 having a configuration and orientation substantially as shown in FIGS. 1 and 2 during operation of the tape drive 20.

Figure 4:
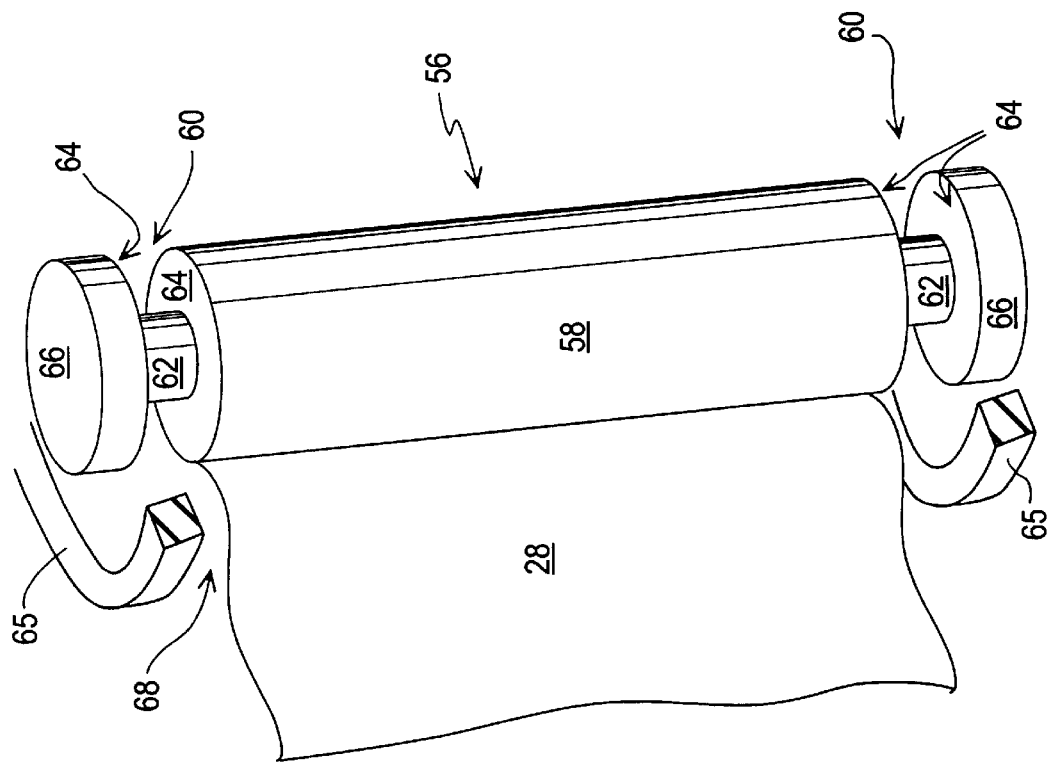
FIG. 4 is an enlarged, perspective view of the leader pin, with a pair of hooks of a connector subassembly positioned for engagement with the leader pin.

Referring to the tape cartridge 24 in somewhat more detail, it includes a substantially cylindrical leader or tape pin 56 (FIGS. 1 and 4) attached to an end of the tape 28 such that when the tape 28 is fully retracted into the tape cartridge 24 (and thus wound about the cartridge hub 32), the leader or tape pin 56 seats within the pin recess 59 of the tape cartridge. The leader pin 56 has five sections; they are: (i) a central cylindrical body 58, (ii) two pin slots 60, one at each end of the cylindrical body wherein each pin slot includes a reduced diameter cylindrical slot interior 62 and two opposing sides 64; and (iii) two cylindrical end pieces 66, one at each end of the leader pin. The pin recess 59 includes two spaced apart pin stays 65 that are positioned so that the leader pin 56 seats against these stays 65 when resting within the recess 59. In particular, each end piece 66 seats with an adjacent pin stay 65 so that the pin slots 60 are not occluded by the pin stays 65 and therefore remain fully accessible from the interior of the tape cartridge 24. That is, the pin stays 65 do not restrict access to the reduced diameter cylindrical slot interiors 62.

Returning now to FIG. 1, note that a threader band 80 (also denoted a leader) is provided within the tape drive 20 for threading the tape 28 through the tape drive 20. In particular, the leader 80 is threaded along the leader path 82 which is, in one embodiment, two parallel spaced apart slots 84 provided within a threading frame 88 (FIGS. 1 and 3). Accordingly, the leader 80 is attached at one end to the take up reel assembly 40 while the other end of the leader has a hook 94 attached thereto for hooking the leader pin 56 for threading the tape 28 through the tape drive along a similar (but not identical) path as the leader path 82 taken by the leader 80. Thus, once the pin 56 is secured by the hook 94, the take up reel assembly 40 rotates thereby winding the leader 80 on the take up reel assembly 40 and consequently threading the magnetic tape through the tape drive 20.

A more detailed illustration of an embodiment of the hook end of the leader 80 is shown in FIG. 5. In particular, note that the leader 80 has two spaced apart parallel threading bands 98 that are only connected to one another via their attachments at one end to the take up reel assembly 40, and via the connector, e.g. hook subassembly 94, at the opposite end of the threading bands. The threading bands 98 are spaced apart a distance appropriate for freely moving in the parallel slots 84 (FIG. 3) in the direction of the leader path 82. Moreover, note that such spacing between the threading bands 98 is greater than the width of the magnetic tape 28; e.g., for a magnetic tape having a width of about 12.65 mm, the threading bands 98 may be spaced apart by about 17 mm. Each threading band 98 includes a series of equally spaced holes 102 spaced along the end of the threading band 98 adjacent to where the hook subassembly 94 attaches thereto. These holes 102 are for engaging the teeth of a sprocket and thereby assuring that the hook end of the leader 80 moves in a desired manner during the hooking and unhooking of the leader pin 56 (as will be further described hereinbelow). Additionally, at least one of the threading bands 98 includes sensor holes 106 for allowing light from light-emitting sensors within the tape drive 20 to pass through the threading band for detection by corresponding light-receiving sensor along the leader path 82 as will also be described further hereinbelow.

Regarding the hook subassembly 94, included therein are two pin hooks 10 with a stay 114 fixedly attached therebetween. Each of the pin hooks 110 has one end attached to a threading band 98. From this attachment each pin hook 110 extends in a particularly advantageous hook shape for reliably hooking and unhooking the leader pin 56. In particular, each of the pin hooks 110 is curved for entering into a corresponding one of the pin slots 60 so that the slot interior 62 of the pin slot is captured within the interior of the pin hook in a manner that substantially precludes accidental dislodgement therefrom during threading or unthreading of the magnetic tape from the tape drive 20.

Figure 6:
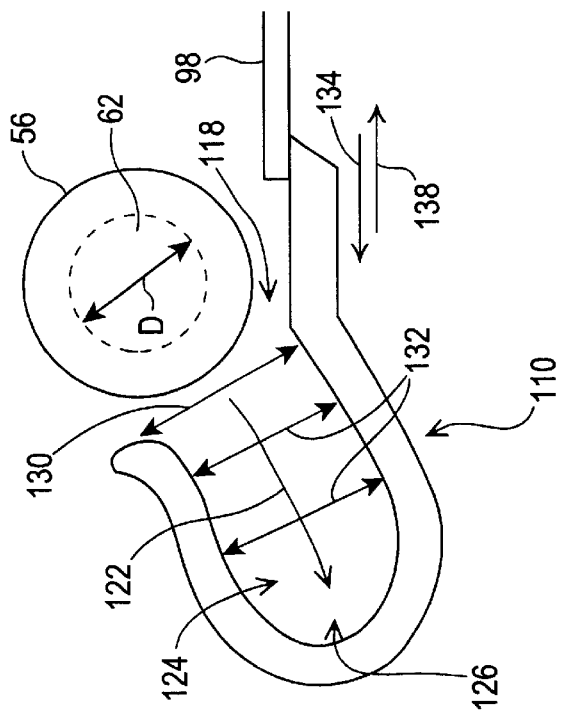
FIG. 6 is an enlarged, fragmentary side view of one of the two hooks of the connector subassembly, with the leader pin being illustrated as about to be joined with a hook.

FIG. 6 shows a view of one of the pin hooks 110 thereby illustrating the novel shape of the pin hook. However, in order to more fully appreciate the functional aspects of the pin hook 110, a brief description of the hooking action is now provided. Accordingly, for hooking the slot interiors 62 of the leader pin 56, each pin hook 110 enters the tape cartridge 24 through the opening 68 wherein each pin hook 110 is adjacent to one of the pin slots 60. Subsequently, the pin hooks 110 are synchronously pivoted clockwise (in a manner further described hereinbelow) so that the hook opening 118 of each pin hook 110 rotates into alignment with the adjacent slot interior 62. Thus, as the leader 80 retracts from the tape cartridge 24, each slot interior 62 enters the adjacent hook opening 118 and subsequently traverses the hook interior along the direction of arrow 122 until the slot interior contacts the closed end 126 of the pin hook.

Note that the unhooking action is substantially the reverse of the hooking action. That is, the hooked leader pin 56 seats in the pin recess 59, the hook pins 110 disengage from the slot interiors 62 by entering the tape cartridge 24, the hook subassembly 94 is rotated counterclockwise so that when it is retracted from the tape cartridge 24, the pin hooks 110 can retract from the tape cartridge without re-engaging the slot interiors 62, and additionally, without re-engaging the leader pin 56.

Accordingly, given the above hooking and unhooking description, the novel curvature of the pin hooks 110 may now be appreciated. In particular, note that the hook opening 118 is angled from the plane or width of the leader 98 (FIG. 6) at about 30° (more generally, in a range of 10° to 45°), and the hook opening 118 has a width (at arrow 130) that is somewhat wider than the diameter D of the slot interior 76 (e.g., the width being about 1.7 mm for D being about 1.6 mm). Thus, when the hook 94 rotates clockwise and is retracted from the tape cartridge 24, the pin hooks 110 easily grasp the slot interiors 62. Subsequently, upon further retraction of the hook subassembly 94 out of the tape cartridge 24, each slot interior 62 slides along the path indicated by the arrow 122 of the hook interior 124 and seats at the closed end 126 of the pin hook. Thus, since the pin hook interior width (e.g., at the arrows 132) is only marginally wider than the diameter D of the slot interior 62, and since the thickness 134 (FIG. 5) of each pin hook is only marginally smaller than the distance between the parallel sides 64 of a pin slot 60, each pin hook snugly engages the leader pin 56 such that there is substantially no lateral leader pin movement transverse to a direction it travels along the leader path 82. Moreover, since the pin hook interior is angled relative to the directions (e.g., arrows 134 and 138) of hook subassembly 94 movement during the tape threading and/or unthreading processes, the leader pin 56 is not susceptible to disengagement from the pin hooks 110 in the directions of arrows 134 and 138. In particular, when the engaged leader pin and hook subassembly 94 are rapidly slowed down during the threading and/or unthreading process, any potential movement for decoupling the pin 56 and the hook subassembly 94 is substantially precluded since such movement is likely to be in the directions of arrows 134 and 138 and not in the angled direction that the leader pin would have to travel in order to exit from one or both of the pin hooks 110. Thus, the pin 56 and the hook subassembly 94 remain reliably engaged during the threading and unthreading operations of the tape drive 20.

Figure 7:
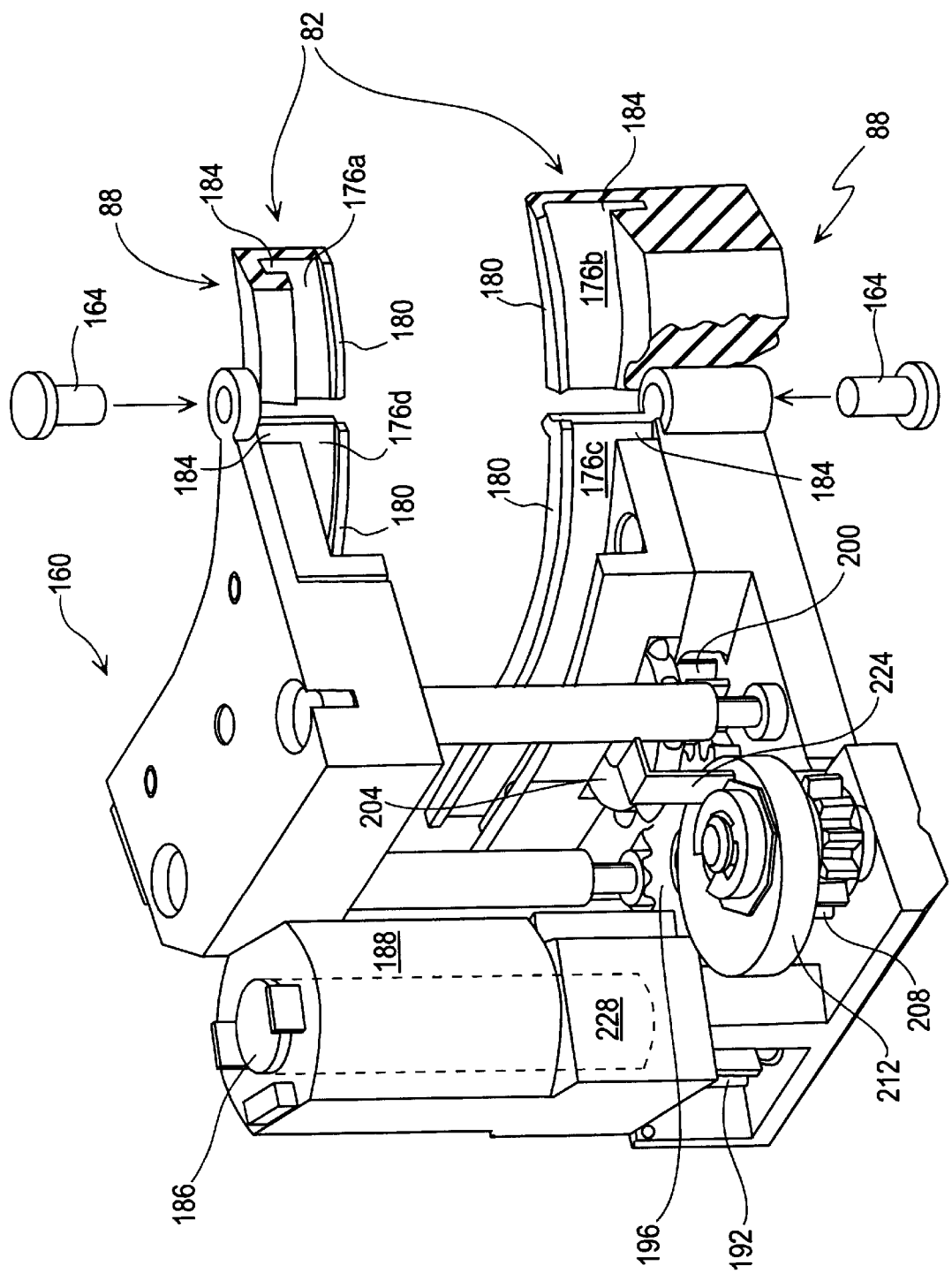
FIG. 7 is a diagrammatic view of the control mechanism including the plurality of gears involved in controlling movement of the leader assembly.

As described hereinabove, during hooking and unhooking of the pin 56 by the hook subassembly 94, the hook subassembly is rotated clockwise and counterclockwise respectively. The hook pivot assembly 160 (e.g., FIGS. 1,7, 8A–8E) performs this task. Referring to FIGS. 1 and 7, the hook pivot assembly 160 is pivotable as a unit about pivots 164 (shown in FIG. 7 as separate components of the tape drive 20 that attach the hook pivot assembly 160 to the remainder of the tape drive 20; however, various arrangements of pivots 164 are within the scope of the invention including pivots that are integral with, e.g., the upper and lower threading tracks 176a and b described hereinbelow). The hook pivot assembly 160 is also biased to pivot in a counterclockwise direction by the spring 168 (FIG. 1) wherein the spring attaches at one end to the pivot assembly 160 and the other end to the threading frame 88. As can be best seen in FIG. 6, the pivot assembly 160 includes an end portion of the leader path 82 which includes the upper and lower threading tracks 176c and d that provide paths for the threading bands 98 along the leader path 82 through the hook pivot assembly 160. Note that each of the threading tracks 176a–d has a ledge 180 that functions as a guide for the threading bands 98. Moreover, note that each of the threading tracks 176a–d is at least partially provided in a corresponding recess 184 that also serves as a threading band guide along the leader path 82.

The hook pivot assembly 160 also includes a motor 188 for driving a plurality of gears that cause the hook pivot assembly 160 to pivot, and also cause the hook 94 subassembly to move into and out of the tape cartridge 24 in the direction of the leader path 82 adjacent to the magnetic tape exit from the tape cartridge 24. Note that there are four gears included in the hook pivot assembly 160, these being:

(i) A drive gear 192 which is attached to the shaft 186 of the motor 188, wherein the drive gear is directly driven by the motor;

(ii) A planetary gear 196 which is driven by the drive gear 192;

(iii) A sprocket gear 200 which is intermittently driven by the planetary gear 196, wherein the sprocket gear, in turn, is attached to and rotates a pair of sprockets 204 (only one of which is shown in FIG. 7) for moving the leader 80 along the leader path 82 (as will be further described hereinbelow); and (iv) A cam gear 208 which is also intermittently driven by the planetary gear 196, wherein the cam gear, in turn, is attached to and rotates a cam 212 for pivoting the hook pivot assembly 160 (as will also be further described hereinbelow).

Additionally, note that the planetary gear 196 is attached to the remainder of the hook pivot assembly 160 by an arm 216 (FIGS. 1, 8, and 9) that pivots about the shaft 186. In particular, the planetary gear 196 is rotatably attached to the end of the arm 216 opposite the arm attachment to the shaft 186. Thus, the arm 216 is able to pivot the planetary gear 196 between at least a first position for engaging the teeth of the sprocket gear 200., and a second position for engaging the teeth of the cam gear 208.

Referring now primarily to FIGS. 8A–8F, the operation of the pivot assembly 160 during the attaching of the hook 94 to the leader pin 56 is shown. Accordingly, in FIG. 8A, the pivot assembly 160 is in an inactive state, wherein the leader 80 extends along the leader path 82 from the take up reel assembly 40 to the open end 220 of the leader path. Moreover, at least one hole 102 of each threading band 98, nearest the hook 94, is grasped by the pair of sprockets 204 thereby securely holding each threading band 98 in its corresponding threading track 176.

Figure 8A:
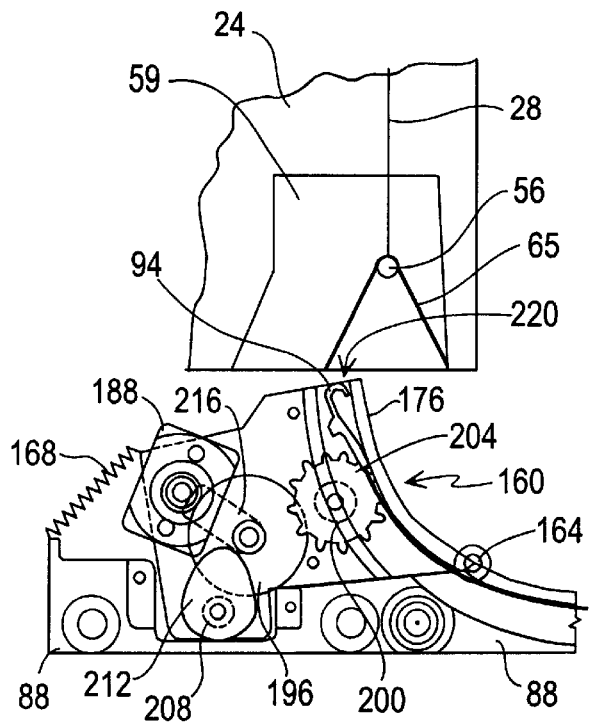
FIGS. 8A–8F diagrammatically illustrate sequential steps that are conducted related to loading (attaching) of the leader assembly to the leader pin.
Figure 8B:
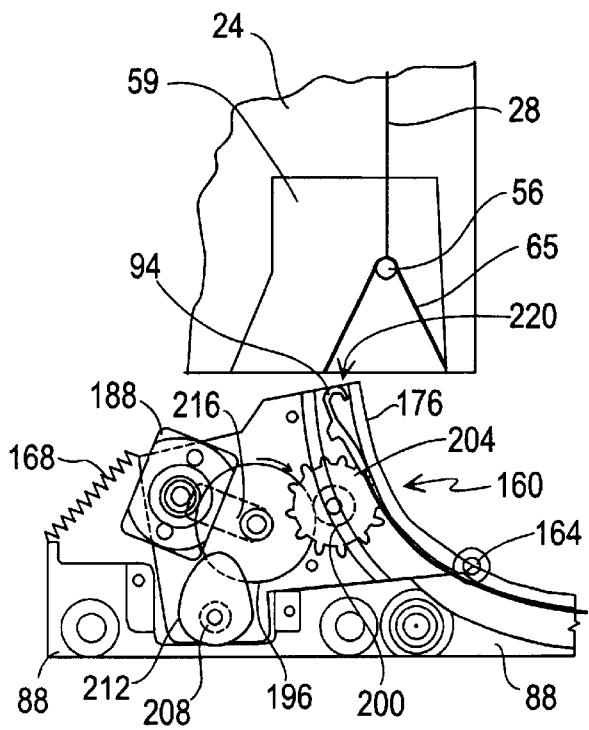
Figure 8C:
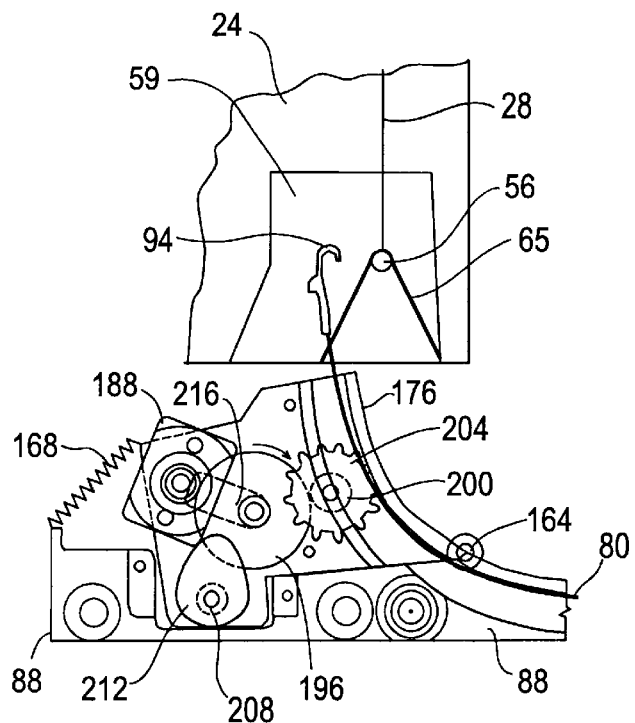
Figure 8D:
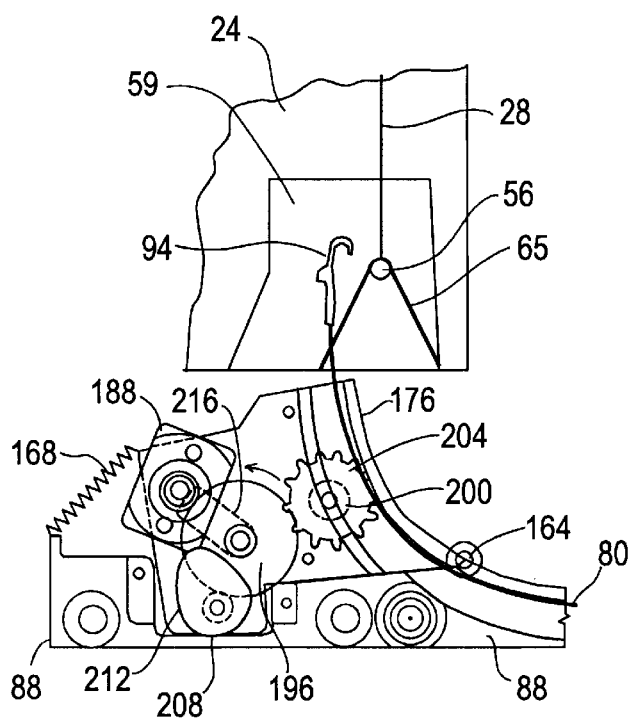
Figure 8E:
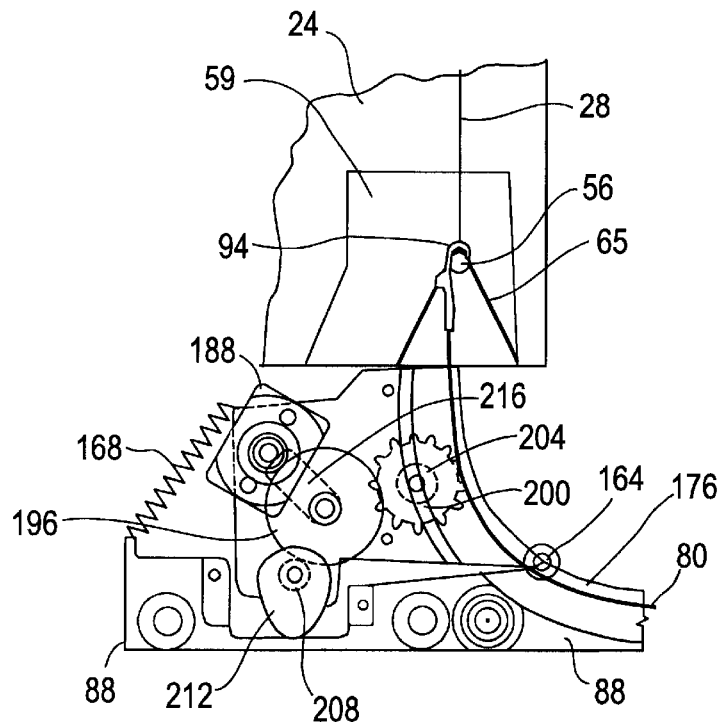
Figure 8F:
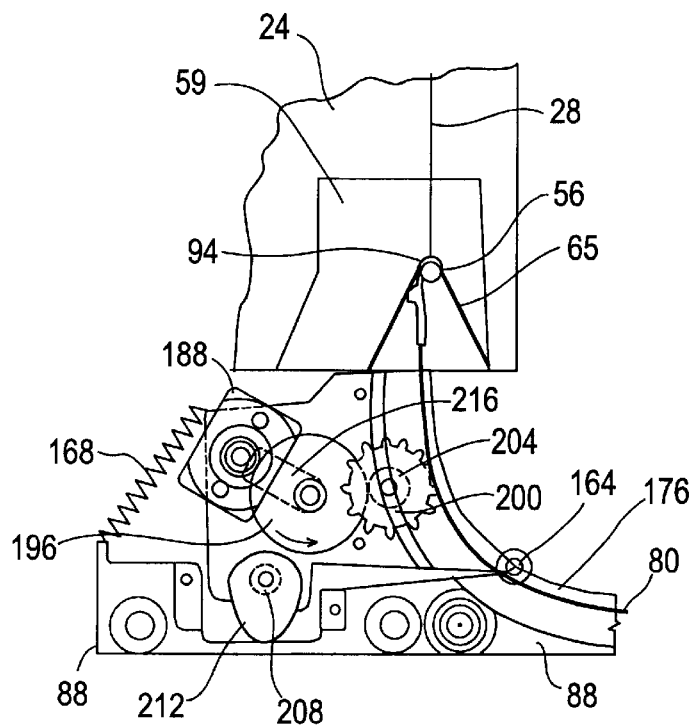
Figure 9A:
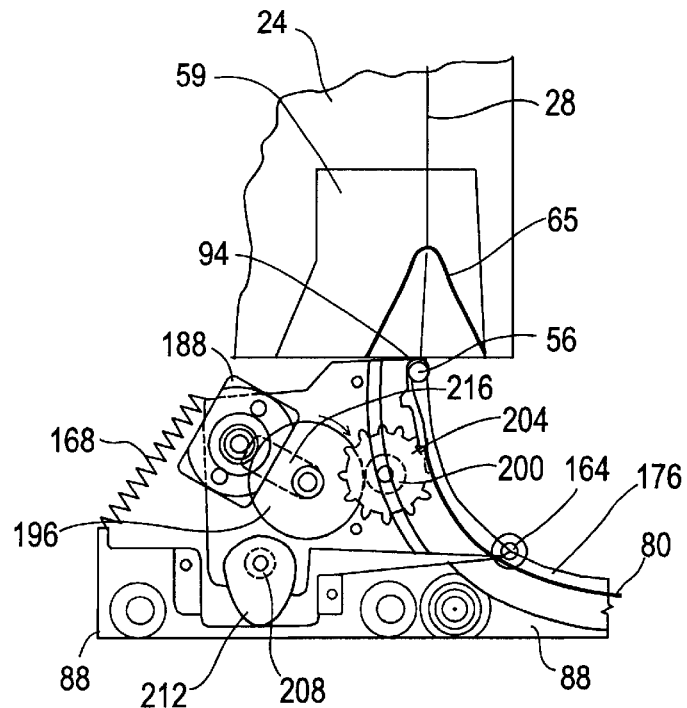
FIGS. 9A–9E diagrammatically illustrate sequential steps that are conducted related to unloading (detaching) the leader assembly from the leader pin.
Figure 9B:
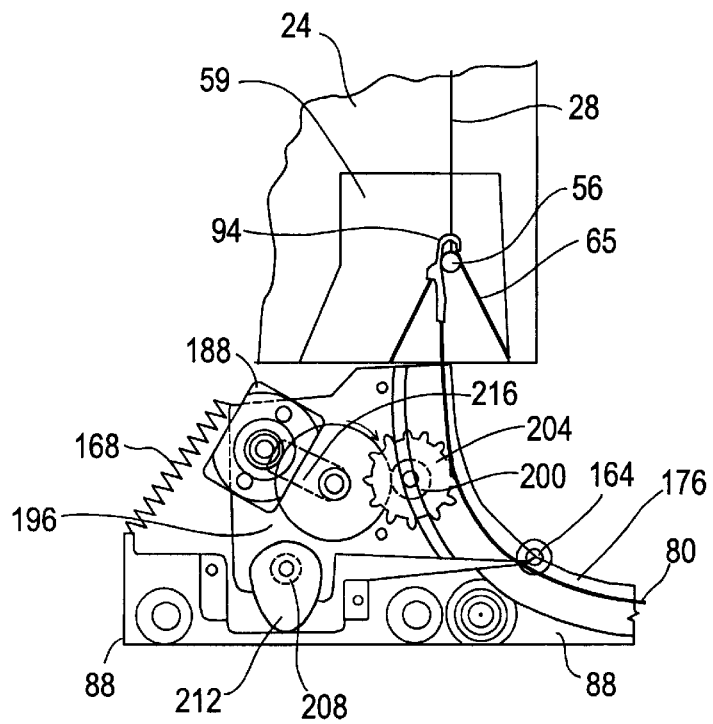
Figure 9C:
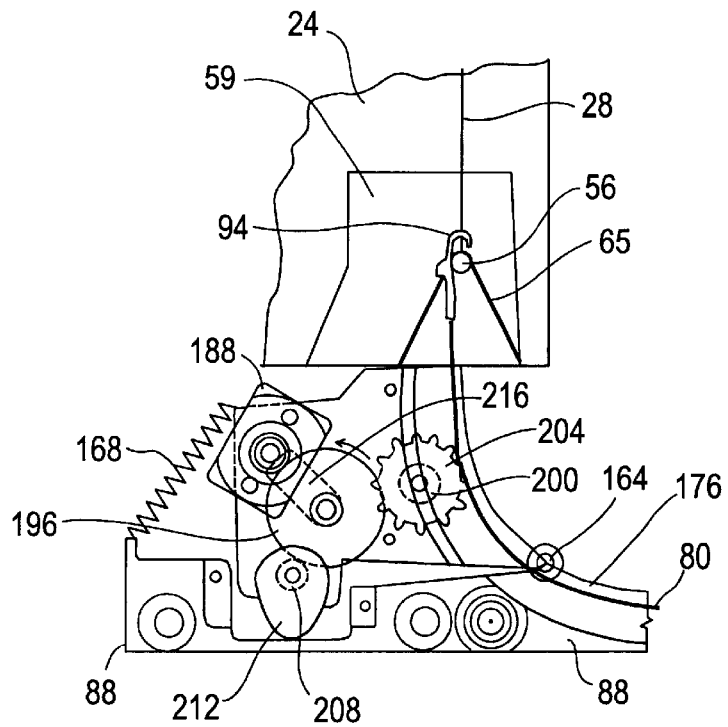
Figure 9D:
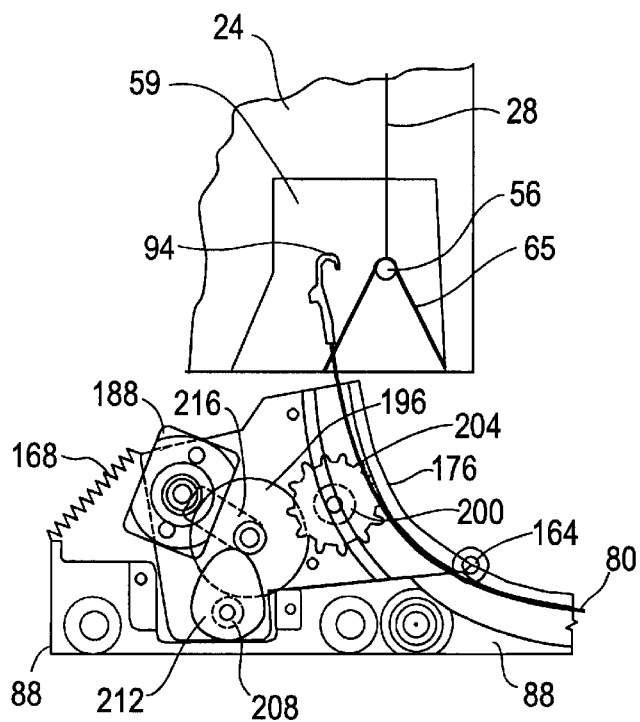
Figure 9E:
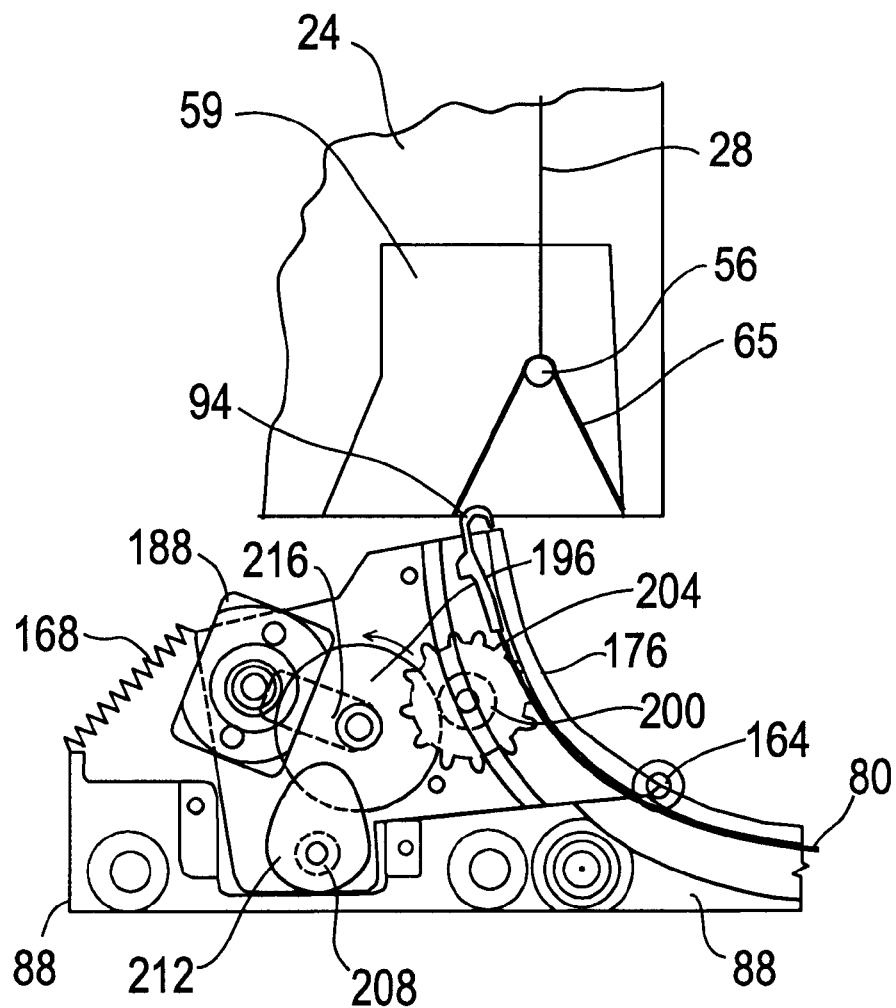

Upon receiving a request for threading a tape through the tape drive 20, an electronic controller (not shown) therein activates the motor 188 to rotate counterclockwise as shown in FIG. 8B. Accordingly, the drive gear 192 causes the planetary gear 196 to rotate clockwise. Moreover, substantially concurrently with the activation of the motor 188, the arm 216 pivots counterclockwise so that the teeth of the planetary gear 196 meshes with the teeth of the sprocket gear 200. Thus, the counterclockwise rotation of the drive gear 192 induces a counterclockwise rotation of the sprockets 204. Moreover, since the spacing of the holes 102 match the spacing between the teeth of each of the sprockets 204, the sprocket teeth mate with the holes 102 to thereby urge the hook 94 to extend out of the open end 220 of the pivot assembly, and into the tape cartridge 24 as shown in FIG. 8C. In particular, note that the hook 94 extends further into the tape cartridge 24 than where the pin 56 is seated against the pin stays 64. Additionally, once the motor 188 stops and the hook subassembly 94 is maximally extended into the tape cartridge 24 (such maximal extension being, e.g., approximately 8 mm of the leader 80), the motor 188 is driven clockwise and the arm 216 rotates clockwise so as to disengage the planetary gear 196 from the sprocket gear 200 and engage with the cam gear 208. Following this, the motor 188 is driven to rotate in the opposite (e.g., clockwise) direction as shown in FIG. 8D. Thus, there is a resulting clockwise rotation of the cam gear 208 which causes the cam 212 to correspondingly rotate and thereby bias the pivot assembly 160 away from the threading frame 88 in a clockwise pivoting action about the pivots 164. Moreover, the motor 188 rotates the cam gear 208 until a sensor interrupt flange 224 (FIG. 7), that is attached to the upper cam surface 228, rotates into a position wherein this flange interrupts a light beam emitted from a light-emitting sensor (not shown, but in one embodiment, residing adjacent the motor surface 228 of FIG. 7; however, the sensor is mounted to the threading frame 88). In particular, the light beam emitted by the light-emitting sensor is directed in the direction of a light-receiving sensor, wherein this light-receiving sensor is operatively connected to the controller for thereby deactivating the motor 188 when light is no longer sensed. Note that as shown in FIG. 8E, such deactivation takes place when the cam 212 is in a position for substantially maximally pivotally biasing the pivot assembly 160 clockwise away from the threading frame.88. Thus, the pivoting action induces the hook subassembly 94 to move toward the pin 56 such that the pin is between the hook opening 118 and the threading track 176. Thus, with the pivot assembly 160 remaining in the clockwise pivoted position, the arm 216 is again pivoted about the shaft 186 in a counterclockwise direction so that the planetary gear 196 disengages from the cam gear 208 and engages the sprocket gear 200. Consequently, the electronic controller activates both the motor 188 to rotate the drive gear 196 in the clockwise direction, and a motor (not shown) of the take up reel assembly 40 for winding the leader 80 thereabout. Thus, the sprocket gear 200 and the sprockets 204 also rotate in a clockwise direction thereby causing the hook subassembly 94 to engage the pin 56, and more particularly, cause each of the pin slots 60 to enter a corresponding hook interior 124 and seat against the corresponding pin hook closed end 126. Subsequently, as the sprockets 204 continue to pull the leader 80 along the leader path 82 (and the opposite end of the leader is correspondingly wound about the take up reel assembly 40), the pin 56 and the attached magnetic tape 28 are threaded through the tape drive 20. Note that it is an aspect of the present invention that the leader 80 (and more particularly the threading bands 98) preferably be somewhat stiff, albeit flexible enough to wind about the take up assembly 40. In particular, such stiffness facilitates accurate movement and positioning of the hook subassembly 94 during the grasping and ungrasping of the pin 56. In one embodiment of the present invention, a leader stiffness of approximately 50 Newtons per square millimeter has been found effective for reliably hooking and unhooking the pin 56, plus, retaining sufficient flexibility to properly wind the leader about the take up reel hub 42. However, it is believed that a leader stiffness in the range of 50 to 70 Newtons per $mm^2$ may be used in various embodiments of the present invention.

Figure 10:
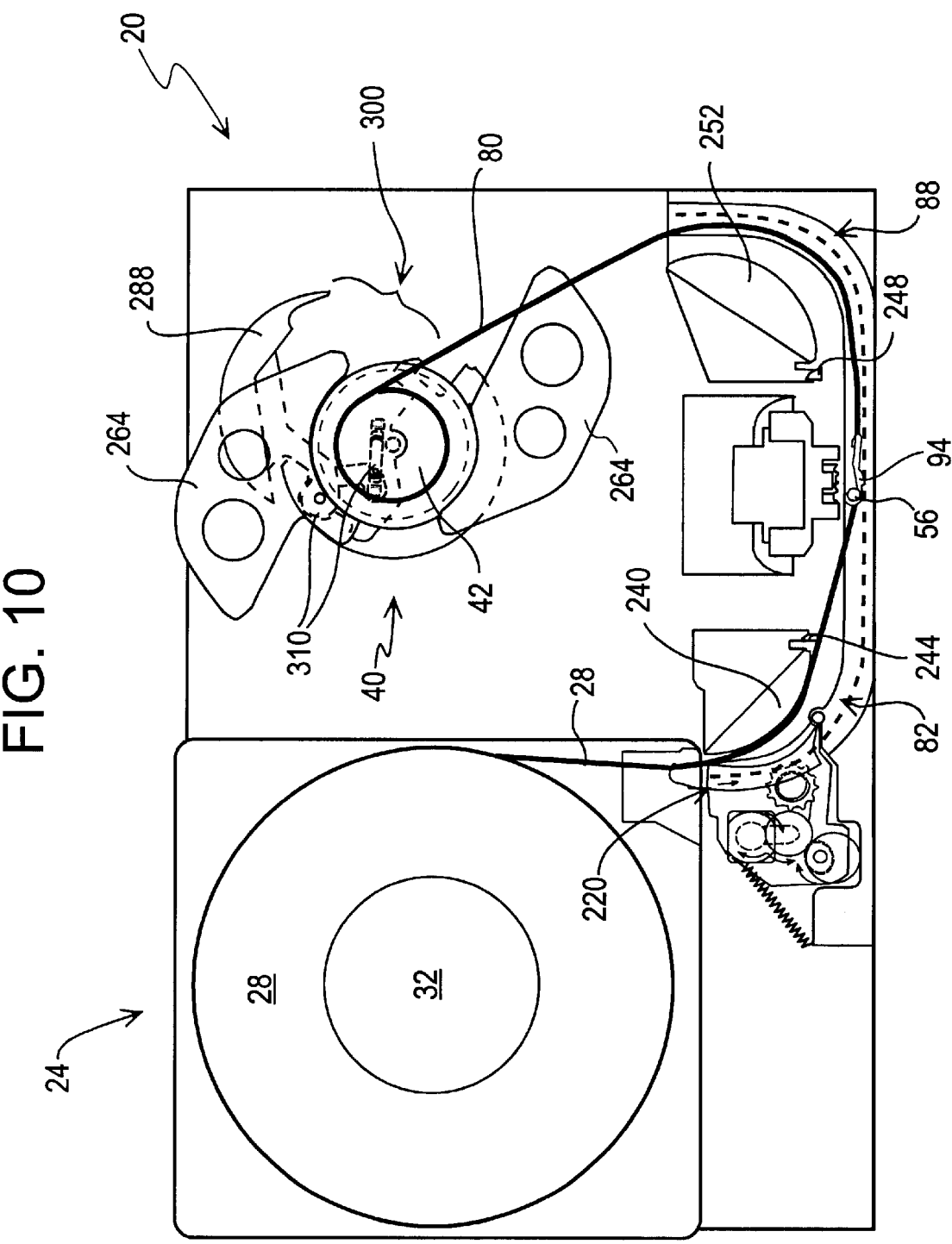
FIG. 10 diagrammatically illustrates a tape drive and tape cartridge, with a take up assembly including a take up reel hub and take up reels.
Figure 15:
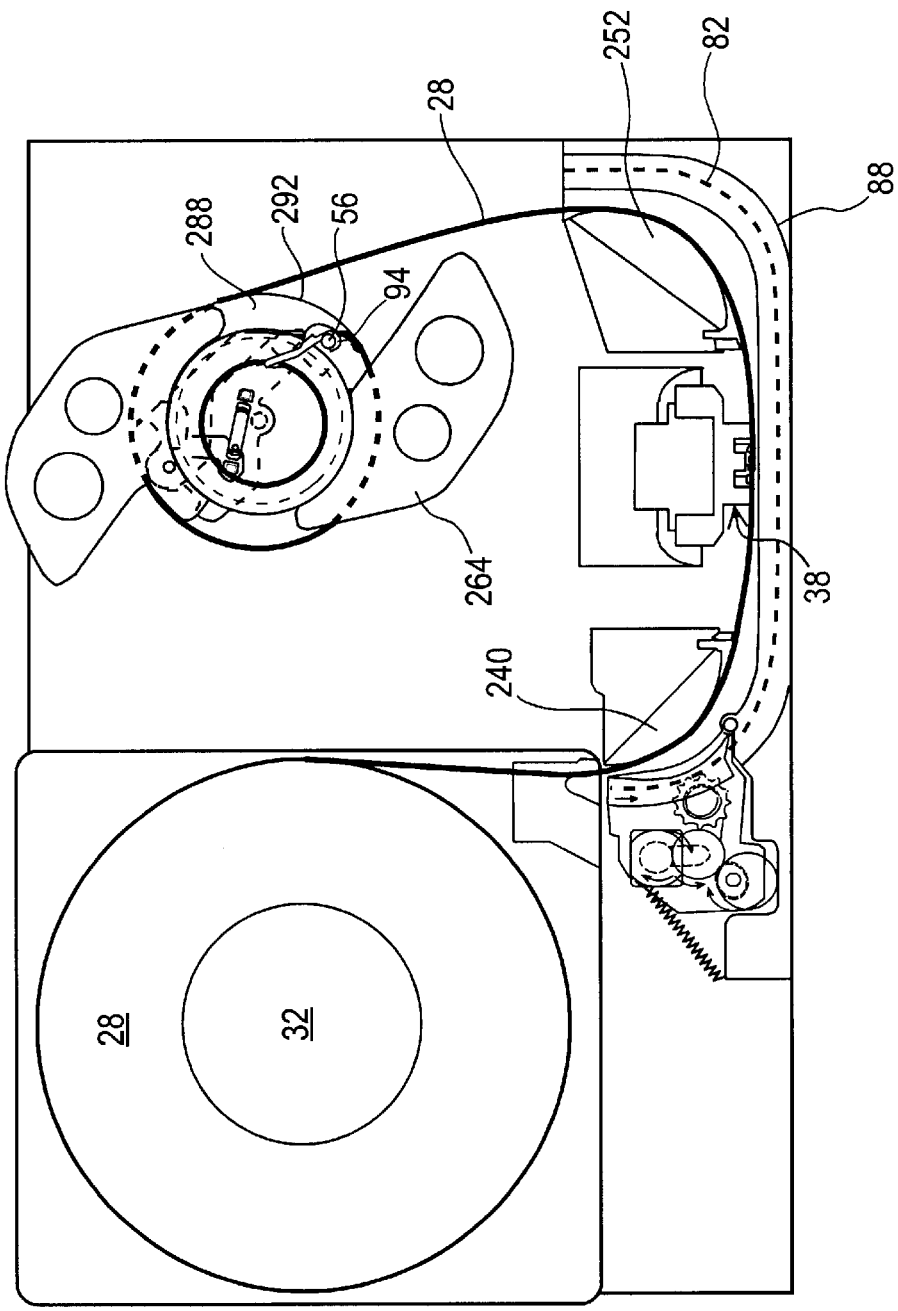
FIG. 15 diagrammatically illustrates the leader pin located relative to the take up reel hub.

Note that once the hook subassembly 94 passes the sprockets 204, detection by a sensor provides the electronic controller with an input that causes it to instruct the motor 188 to deactivate. Thus, the pivot assembly 160 remains in the fully pivoted position until, e.g., the tape 28 is rewound about the cartridge hub 32, and the pin 56 and hook subassembly 94 are decoupled. Also, note that once the hook subassembly 94 passes the sprocket 204 during the threading process, the leader 80 and the tape 28 continue to be threaded through the tape drive 20 by the winding of the leader about take up assembly 40. FIG. 10 shows a configuration of the tape drive 20, wherein the leader 80 has threaded the data storage tape 28 through an initial portion of the tape path through the tape drive. In particular, this figure shows the tape 28 threaded up to approximately the read/write head 38. It is further noted that since the interior of the leader path 82 is open between the threading tracks 176a and 176b, the magnetic tape 28 follows a shorter path through the tape drive 20. For example, in FIG. 10, the magnetic tape 28 is shown taking a shorter path than that of the leader path 82 between the open end 220 of the leader path and the read/write head 38. The path of the tape is constrained and defined by the following components of the tape drive 20 (FIGS. 1 and 10): (a) a first tape guide 240 (being, e.g., a low friction hydrodynamic bearing, in one embodiment manufactured from a ceramic composite), (b) a first tape cleaning blade 244 for removing debris from the tape 28, (c) the read/write head 38, (d) a second tape cleaning blade 248, and (e) a second tape guide 252 (being also, in one embodiment, a hydrodynamic bearing). Note that the tape 28 is shown following the path defined by these components in FIG. 15. Further note that the tape path is designed to accommodate high tape speeds through the tape drive 20, such as a tape speed of 10 meters per second. In particular, the hydrodynamic bearings 240 and 252 are intended to facilitate such high tape speeds without damaging or tearing the tape 28.

Figure 11:
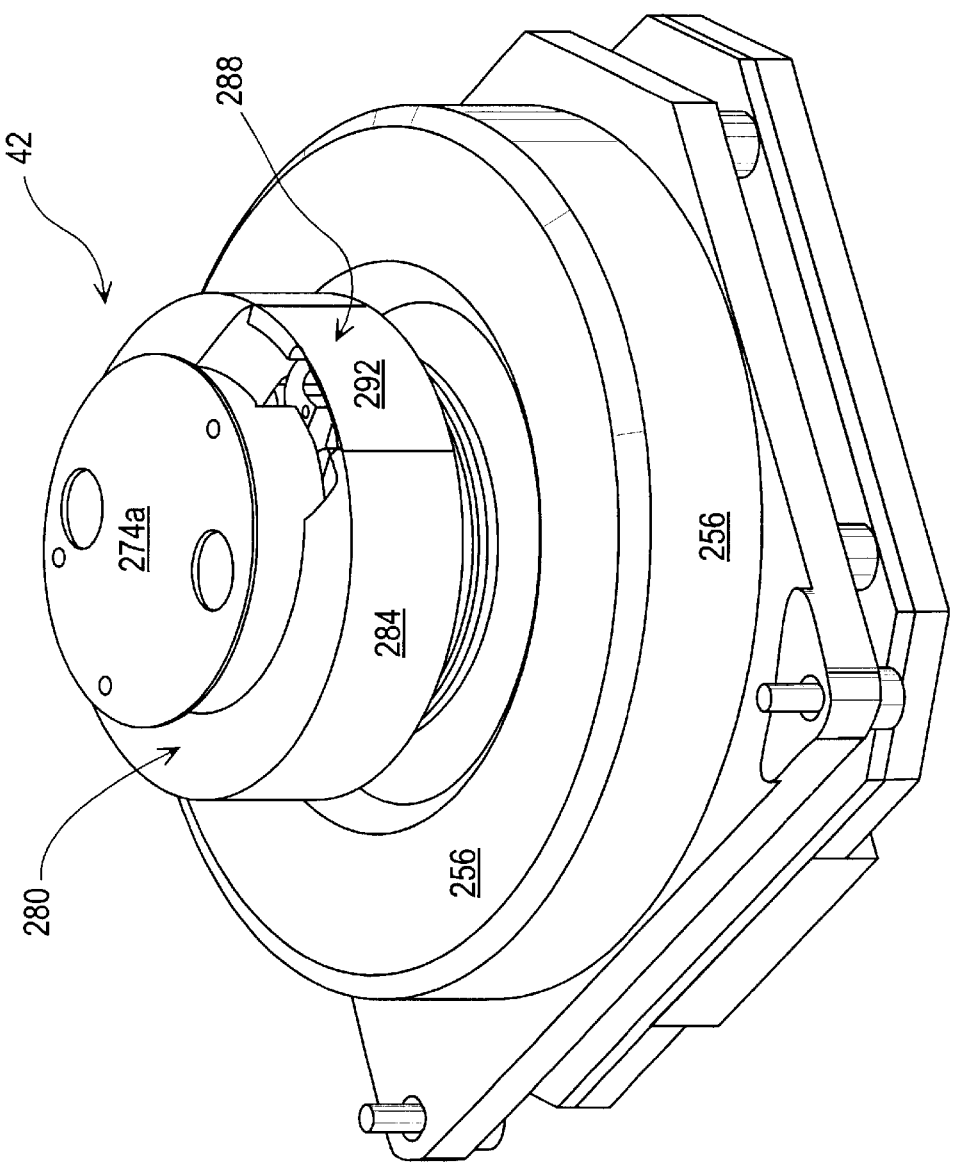
FIG. 11 is an enlarged, perspective view of the take up assembly.
Figure 13:
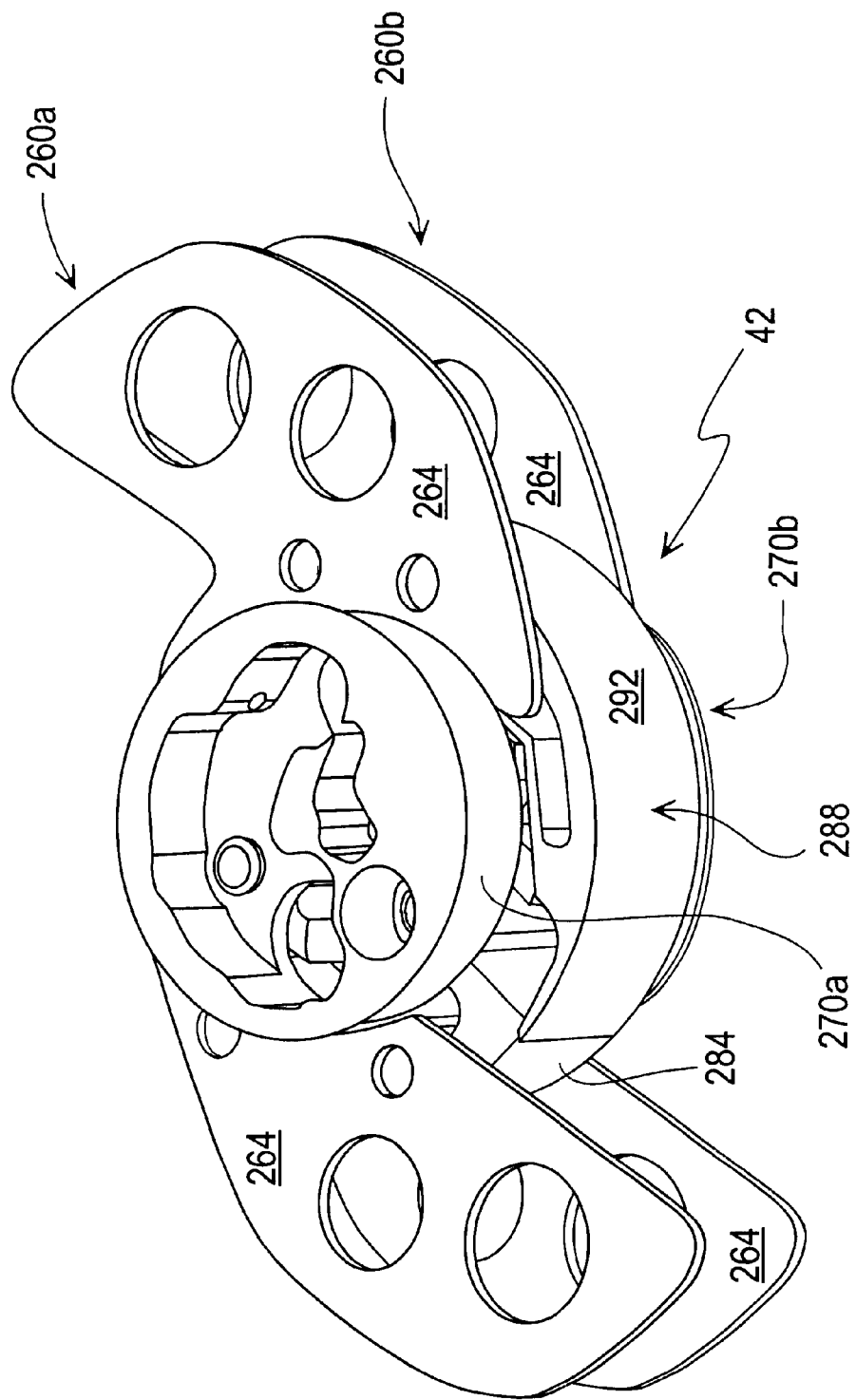
FIG. 13 is a perspective view of the take up assembly illustrating the take up reel hub, the take up reels and the two pairs of flanges on the opposing sides of the take up reel hub.

Referring now to the take up assembly 40, it includes:

(a) the take up reel hub 42 (FIGS. 1, 11 and 12) for winding the tape 28 thereabout;

(b) a motor 256 (FIG. 11) for winding both the leader 80 and the data storage tape 28 about the reel assembly 40;

(c) two pairs of tape alignment flanges 260a and 260b (FIG. 13), wherein each of the pairs 260a and 260b includes a pair of substantially co-planar flanges 264 on opposite sides of the take up reel hub 42, wherein each such pair 260a and 260b are parallelly spaced apart from the other two substantially co-planar flanges 264 included in the other pair of 260a and 260b. Note that the pairs of 260a and 260b are parallelly spaced apart only marginally more than the width of the magnetic tape 28;

(d) two leader take up reels 270a and 270b, wherein each of the threading bands 98 of the leader winds about a different one of the leader take up reels. Note that in the embodiment shown in, e.g., FIG. 13, the leader take up reel 270a is manufactured as a unit with the pair 260a of tape alignment flanges, and the leader take up reel 270b is manufactured as a unit with the pair 260b of tape alignment flanges.

The take up reel hub 42 includes outer caps 274a and 274b (e.g., FIG. 12) which secures therebetween the tape winding core 280 about which the magnetic tape 28 winds on the surface 284. Note that each of the outer caps 274a and 274b has a cutout 296 therein, wherein the cutouts receive at least part of a core door mechanism 288 (also denoted simply as "door" herein) that pivots between:

(a) a closed position (FIGS. 13 and 15), wherein the arcuate surface 292, in combination with the arcuate surface 284, completes the cylindrical or circumferential surface about which the tape 28 winds when it is wound about the take up reel hub 42; and (b) an open position (FIGS. 1 and 10), wherein an interior of the cutout 296 is accessible via the opening 300 (FIG. 10).

Additionally, note that pin 304 (FIG. 12) secures the door 288 in the cutout 296. In particular, the pin 304 extends through hole 308 in the door 288 so that the door pivots on this pin.

Figure 12:
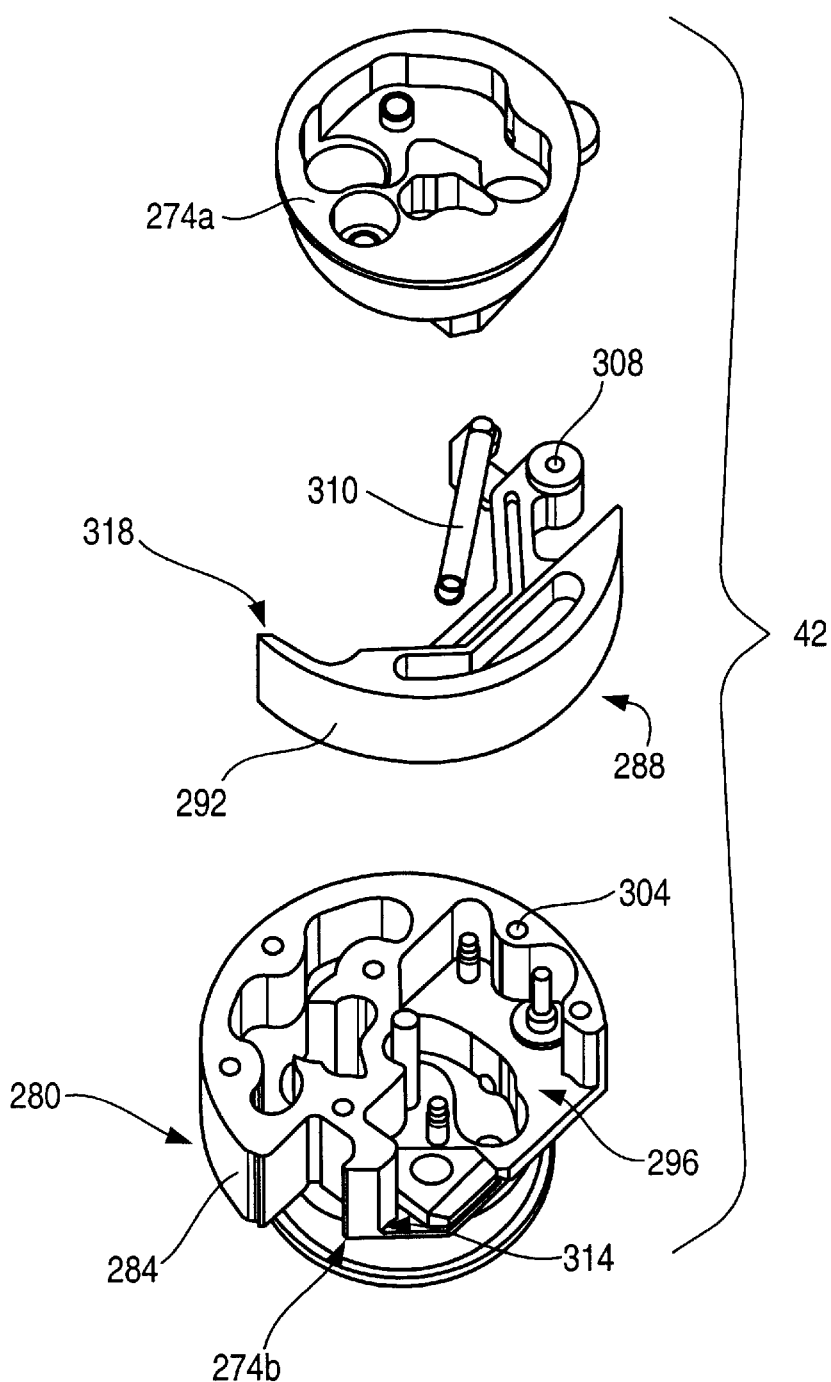
FIG. 12 is an exploded view of the take up reel hub including a first embodiment of a door mechanism.
Figure 14:
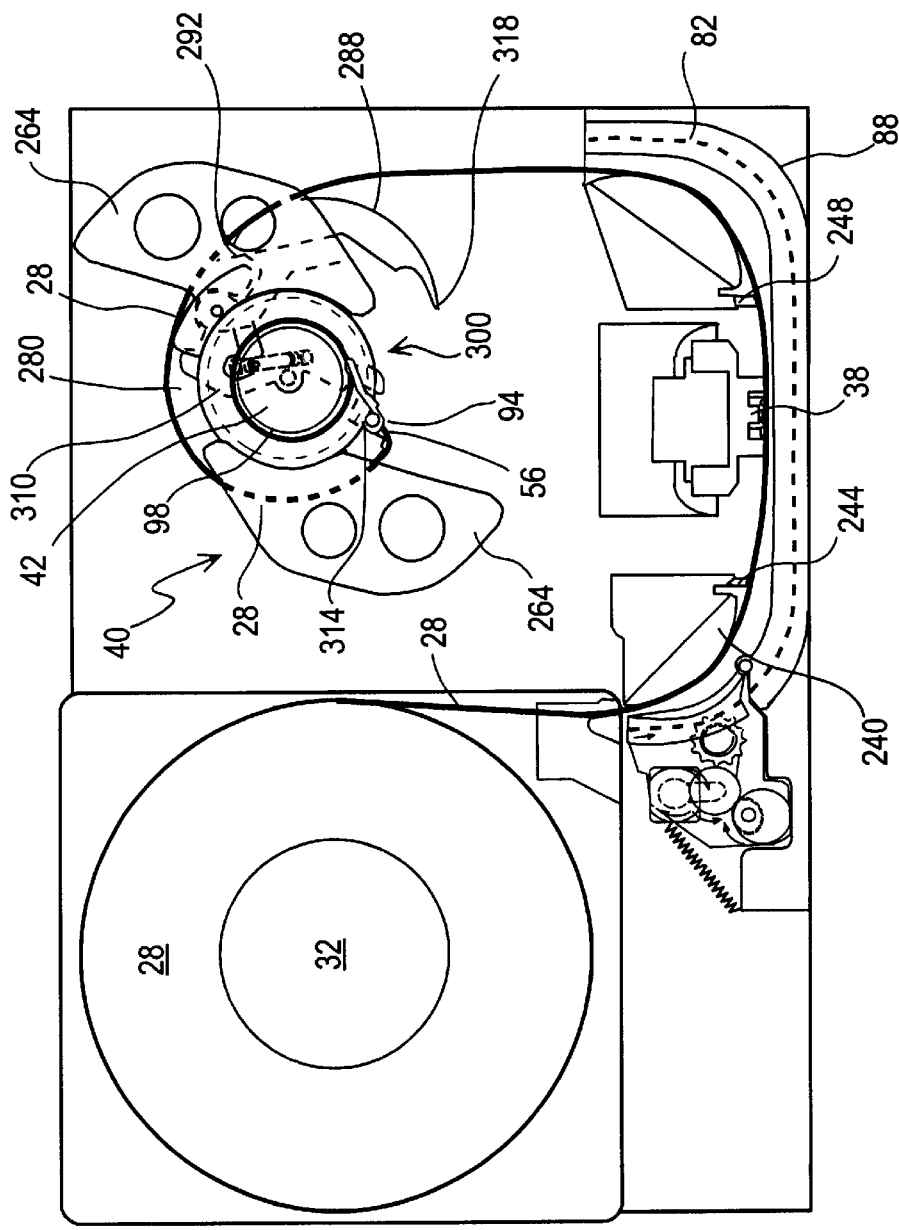
FIG. 14 is a diagrammatic illustration of data storage tape being wrapped about the take up reel hub.

During the threading of the tape 28 through the tape drive 20, each of the threading bands 98 winds around a corresponding one of the leader take up reels 270a and 270b to which the threading band is attached. Note that prior to the pin 56 contacting the take reel hub 42, the door 288 is biased in an open position by a spring 310 and remains open during the rotation of the take up reel assembly 40 until the spring bias is overcome as will be discussed hereinbelow. Subsequently, since the length of the leader 80 and its attachment positions on the leader take up reels 270a and 270b are such that when the hook subassembly 94 and the attached pin 56 reach the take up reel hub 42, the subassembly hook and the pin enter the opening 300 and the pin lodges against the ledge 314 (FIGS. 12 and 14). Note that the ledge 314 is interior to the cylindrical surface composed of the surfaces 284 and 292 about which the tape 28 winds. Subsequently, the tape 28 commences to wind about the surface 284 of the tape winding core 280 until the surface 292 of the open door 288 is encountered. Accordingly, the tape 28 then commences to follow the surface 292 as shown in FIG. 14. Since the typical tension on the magnetic tape 28 during this tape threading process is approximately one Newton, prior to the magnetic tape reaching the free end 318 (FIGS. 12 and 14) of the door 288, the tape tension overcomes the bias of the spring 310 and the door 288 closes thereby enclosing the hook 94 and the pin 56 within the take up reel hub 42. Thus, a substantially smooth and uniform circumferential surface (i.e., the combined surfaces 284 and 292) is provided for winding the magnetic tape 28 thereabout, since the tape does not contact any of: the leader 80, the hook subassembly 94, and the pin 56.

Regarding the unwinding of the tape 28 and the leader 80 from the take up reel assembly 40, this process is substantially the reverse of the winding process described immediately above. That is, once the innermost layer of the tape 28 wrapping the combined surfaces 284 and 292 unwraps past approximately the midway point along the surface 292 of the door 288, the bias of the spring 310 overcomes the counter-bias of the tape and the door 288 opens thereby allowing the pin 56 and the hook subassembly 94 to freely exit the interior of the take reel hub 42. Thus, once the pin 56 detaches from the take up reel hub 42, the leader bands 98 commence unwinding from the leader take up reels 270a and 270b.

Figure 16:
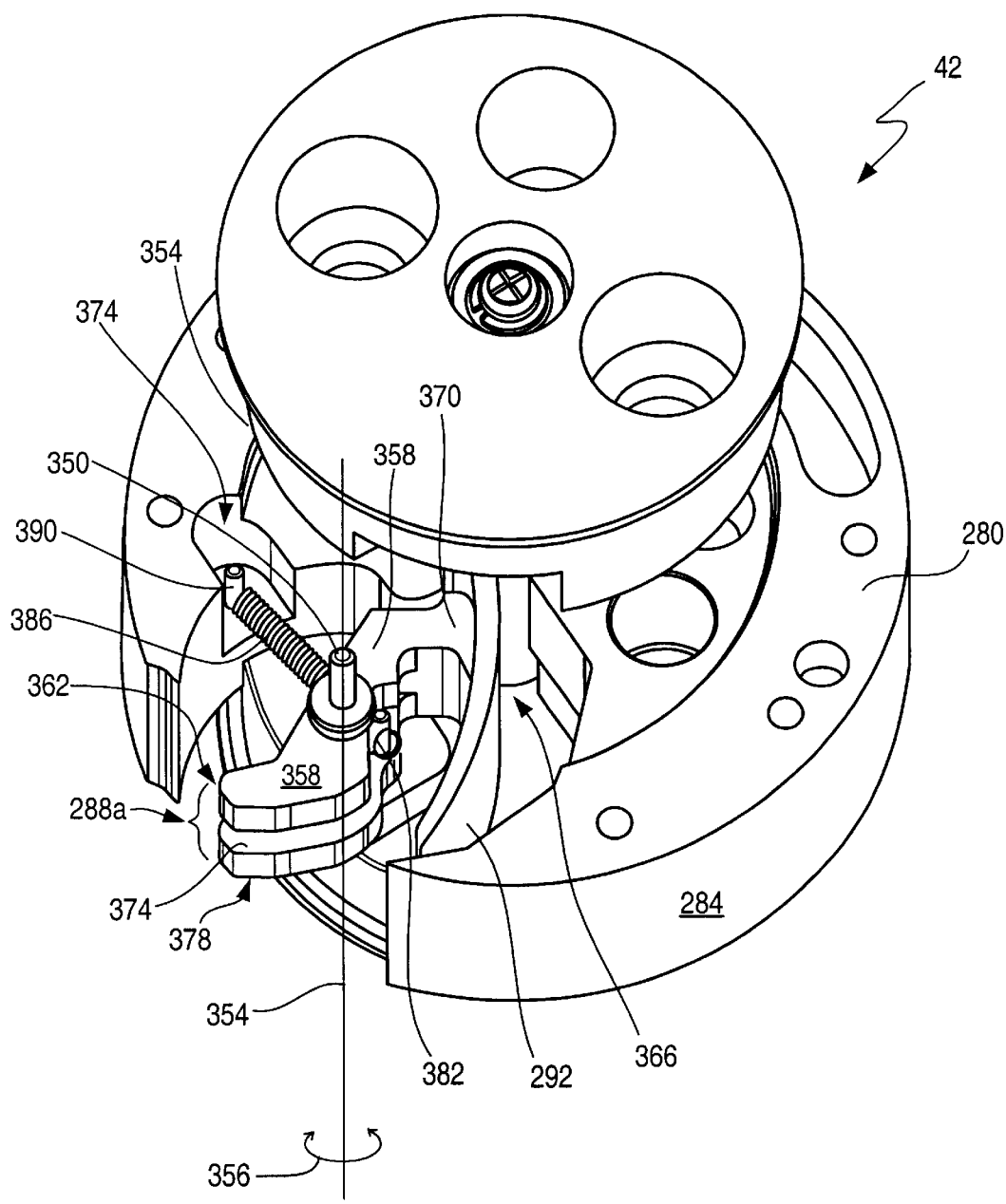
FIG. 16 is a perspective view of a take up assembly illustrating a second embodiment of a door mechanism.
Figure 17:
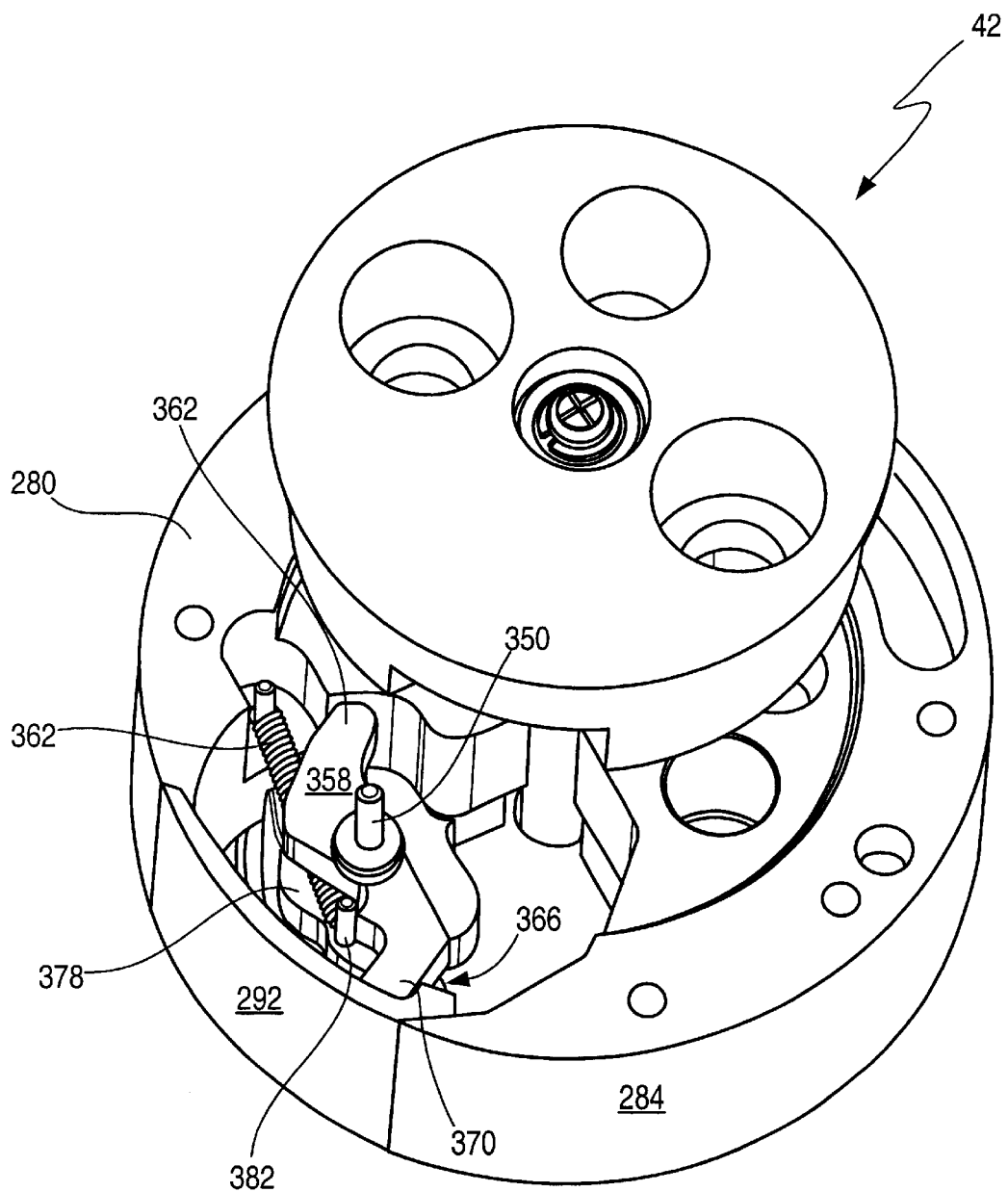
FIG. 17 illustrates the door mechanism of the second embodiment in its closed position.

FIGS. 16–19G show an alternative embodiment of the take up reel hub 42, wherein an alternative configuration of the door mechanism or simply door (labeled 288a) and related components are shown. Referring to FIGS. 16 and 17, the take up reel hub 42 is substantially identical to the initial embodiment of the take up reel hub provided hereinabove. However, instead of the door being substantially outside of the tape winding core 280 when in the open position, the door 288a is substantially interior to the tape winding core when the door is open when as shown in FIG. 16. In particular, the surface 292, upon which the tape winds when the door 288a is closed, it is entirely within the tape winding core 280. The door 288a has a first pivot shaft 350 centered on an axis 354 about which the door pivots (according to rotation arrow 356, FIG. 16). The first pivot shaft 350 is attached to the first door plate 358. The first door plate 358 extends from a free end 362 to an opposite end that is attached to (or integrally molded with) the generally arcuately shaped door face component 366 which has the surface 292 as a "front side", and an opposing "back side" having a reinforced portion 370 to which the first door plate 358 is attached. Additionally, note that there is a second door plate 374 having the same shape as the first door plate 358, wherein the two plates are aligned such that when viewing them along the axis 354, their profiles are identical. Moreover, each of the first and second door plates 358 and 374 are similarly attached to the reinforced portion 370. Additionally, although not shown, the second door plate 374 has attached to its side 378 (entirely hidden in the views of FIGS. 16 and 17) a second pivot shaft 350 that is substantially identical to the first pivot shaft 350. However, the second pivot shaft 350 extends away from the side 378 along the axis 354 in the opposite direction from which the first pivot shaft 350 extends from the first door plate 358.

The first and second door plates 358 and 374 are parallelly spaced apart but attached to one another by a post 382 that traverses the space between the two door plates. Note that the post 382 is offset from the axis 354 so that when the door 288a pivots about the axis 354, the post follows a circular path about the axis 354. Moreover, as an aside, note that there may be additional posts connecting the first and second plates 358 and 374 together as one skilled in the art will understand.

Attached to the post 382 is a spring 386, wherein the spring extends between the post and a spring fastener 390 attached to the tape winding core 280 within a cutout 394. During the rotation of the door 288a between the fully open position of FIG. 16 and the fully closed position of FIG. 17, the post 382 follows an arcuate path 396 (FIG. 18) about the axis 354. Accordingly, the spring 386 changes position and configuration as the post moves along the arcuate path 396. In particular, the spring has sufficient tensile strength to bias the post 382 to the end points 398 and 402 of the arcuate path 396. Accordingly, the spring urges the door 288a to either enter and stay in a fully open position, or enter and stay in a fully closed position. Thus, if the door 288a is open and is urged to close so that the post 382 travels clockwise to a position beyond the midpoint of the path 396, then the door 288 will, from that position on, be biased by the spring 386 to fully close. Conversely, when the door 288a is in the fully closed position and is subsequently urged to open so that the post 382 travels counterclockwise past the midpoint of the path 396, then the door will be biased by the spring 386 to fully open.

FIGS. 19A–19G illustrate the closing of the door 288a at the completion of the threading of the tape 28 through the tape drive 20. Accordingly, in FIG. 19A, the door 288a is shown in its fully open position while the take up reel hub 42 rotates in the direction of arrow 406. Accordingly, no portion of the tape 28 encounters the take up reel hub 42. Instead, the threading bands 98 of the leader 80 are being wound about the leader take up reels 270a and 270b. (Note, each of the take up reels are substantially identical to those shown in the initial embodiment; in particular, the take up reels 270a and 270b of FIG. 13. Further, note that for simplicity the tape alignment flange pairs 260a and 260b are not shown in FIGS. 16–19G).

Figure 19A:
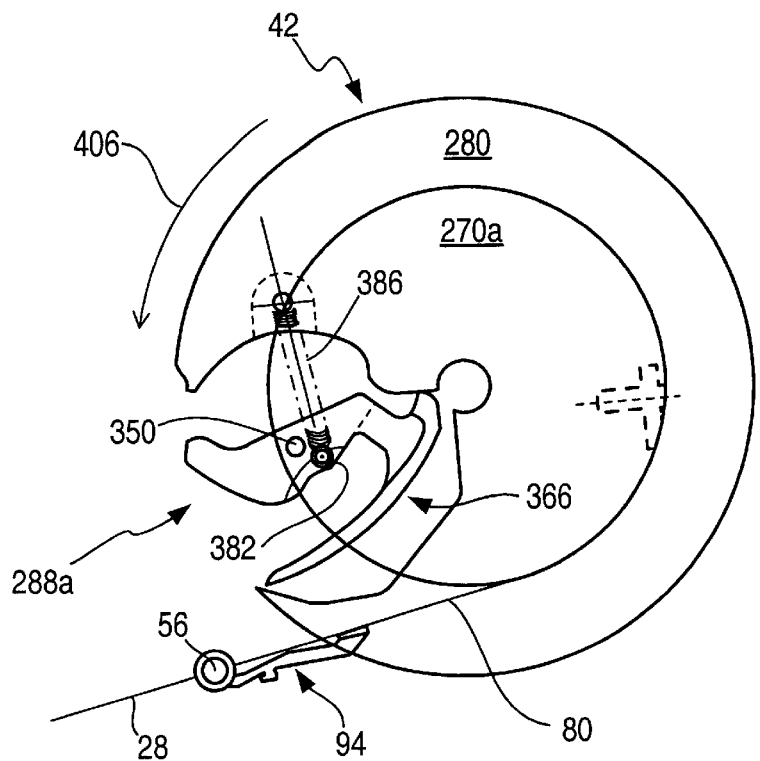
FIGS. 19A–19G diagrammatically illustrate a sequence of steps in which the door mechanism of the second embodiment changes from its open position to its closed position as the door mechanism contacts the leader pin joined to the data storage tape.
Figure 19B:
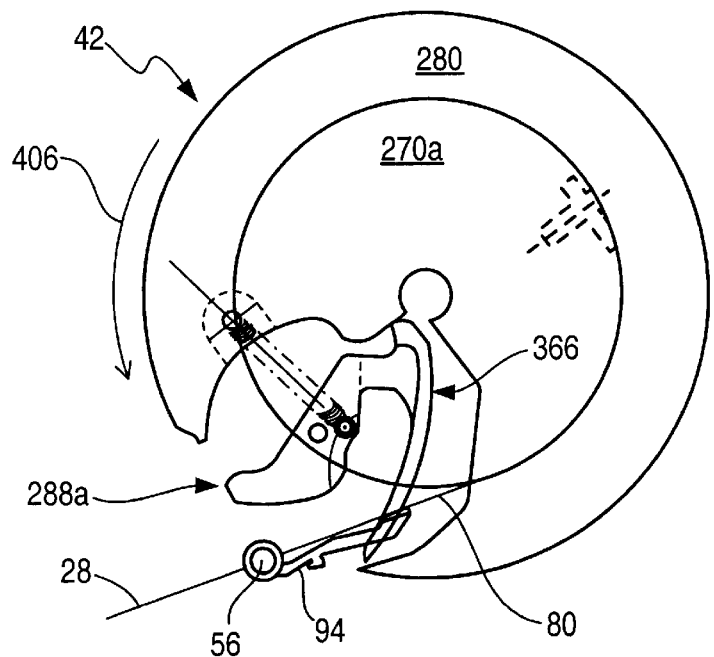

In FIG. 19B, a portion of the arcuately shaped door component 366 has entered the space between the threading bands 98 of the leader 80 due to the winding of the threading bands about the leader take up reels 270a and 270b.

Figure 19C:
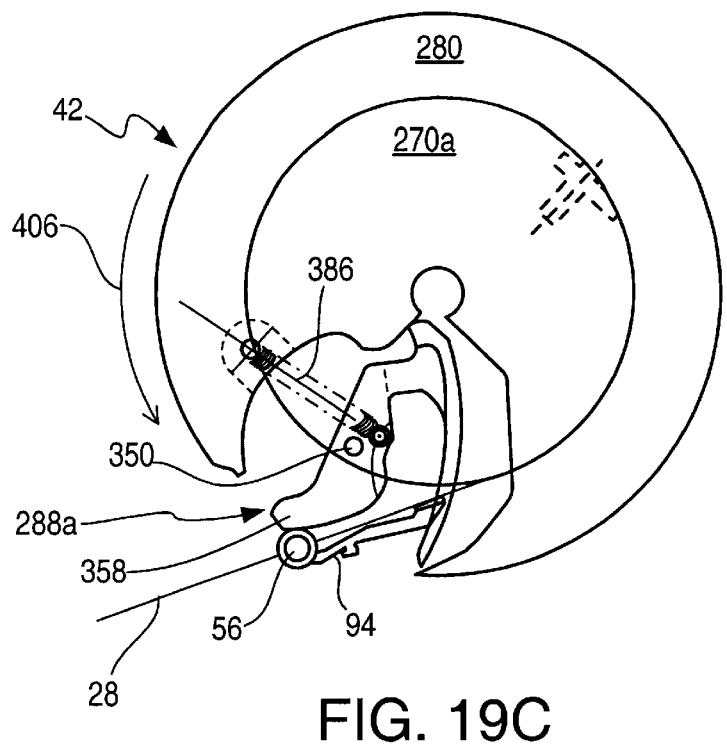

In FIG. 19C, as the take up reel hub 42 continues to rotate, the door 288a contacts the pin 56 which is coupled with the hook subassembly 94. Note that as with the previous embodiment 288a of the door, the length of the leader 80 is such that when substantially fully wound around the leader take up reels 270a and 270b, the coupling of the pin 56 and the hook subassembly 94 is positioned for contacting the door 288a as shown in the present figure. Accordingly, this contact causes the door 288a to commence pivoting clockwise about the first and second pivot shafts 350.

Figure 18:
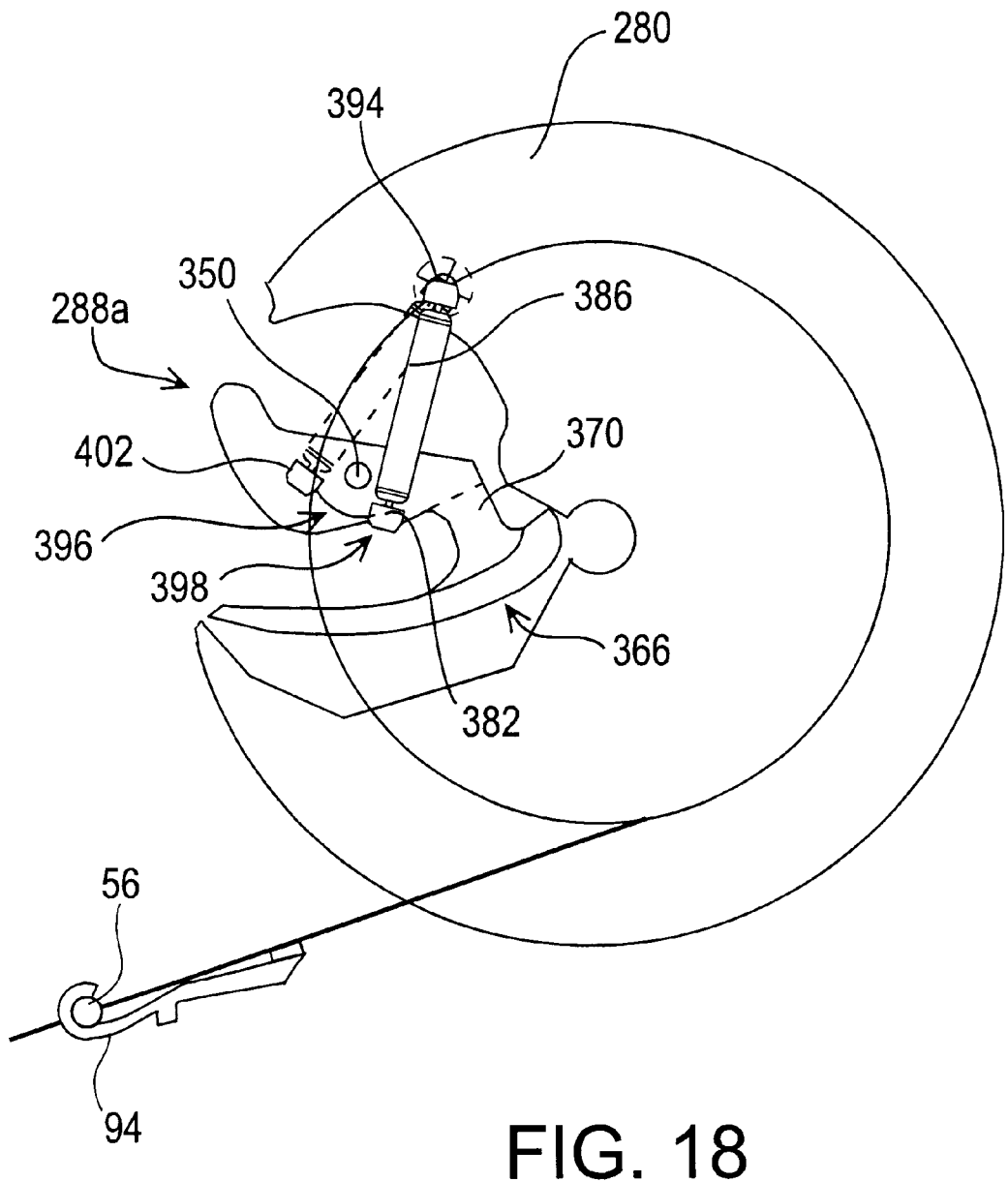
FIG. 18 diagrammatically illustrates the door mechanism of the second embodiment in its open position, with the take up assembly wrapping portions of the leader assembly.
Figure 19D:
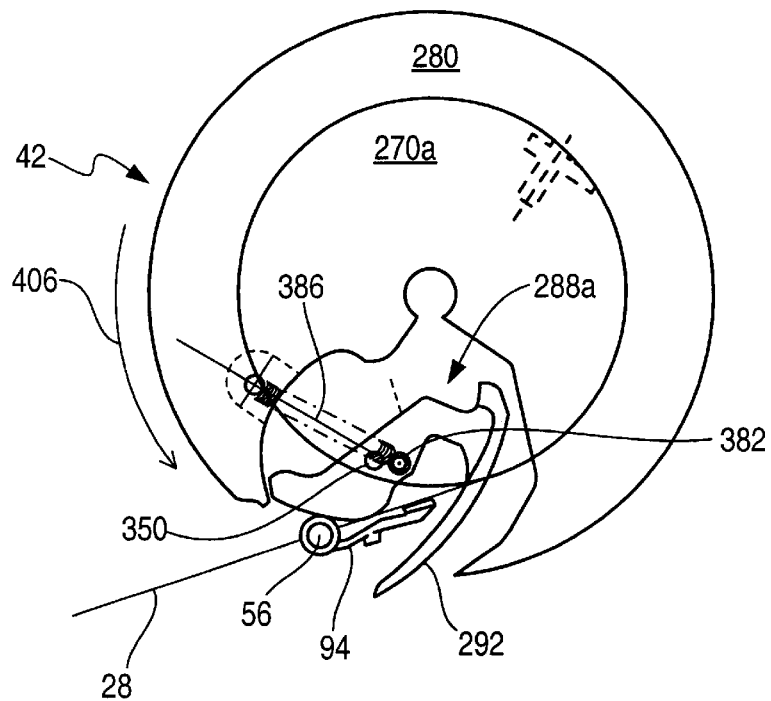

In FIG. 19D, the door 288a is shown pivoting further in the clockwise direction, wherein the post 382 has rotated away from the initial end point position of 398 (FIG. 18). Note that it is an aspect of the present invention that for the portion of the profile of the first and second door plates 358 and 374 where the pin 56 contacts this profile, the profile is smooth and shaped so that the force induced on the door 288a by the pin does not induce a force in the direction of the pivot shafts 350 that could cause the door to bind on the shaft pins or break the shaft pins.

Figure 19E:
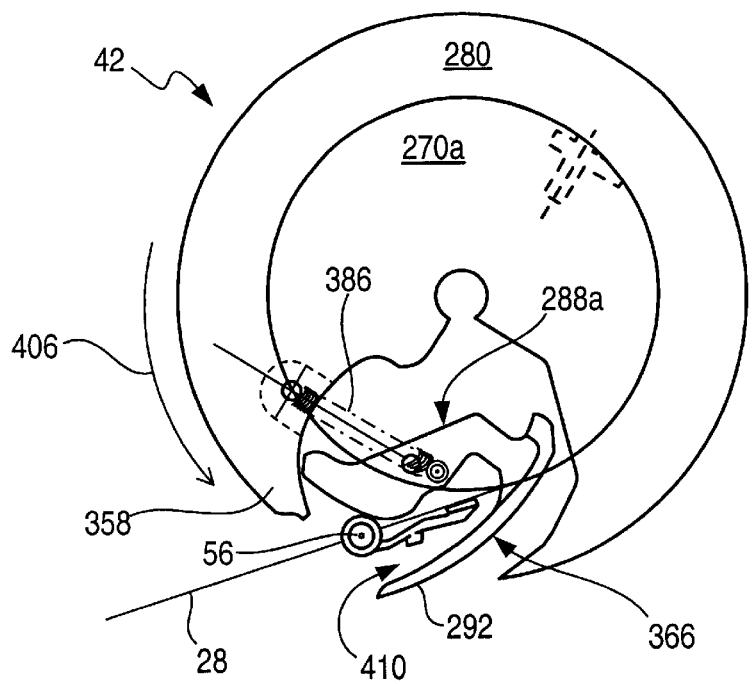

In FIG. 19E, the pin 56 has caused the door 288a to pivot sufficiently so that the post 288 is substantially at a midway position between the positions 398 and 402 (FIG. 18). Thus, the spring 386 is in a substantially maximally extended configuration. Moreover, note that the pin 56 and the hook subassembly stay 114 have begun to enter the recess 410 between: (a) the door plates 358 and 374 on the one side, and (b) the arcuately shaped door face component 356 on the other side.

Figure 19F:
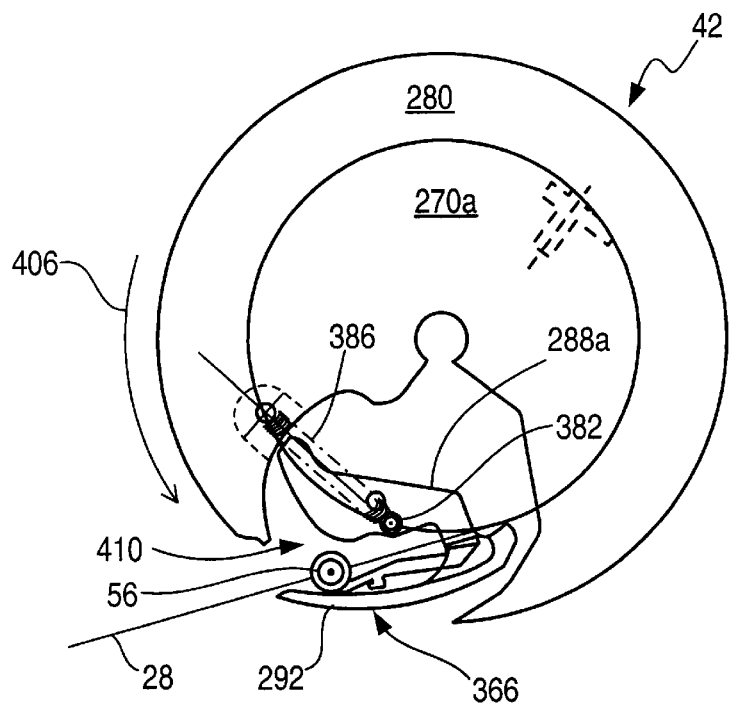

In FIG. 19F, the position of the post 382 is such that the spring 386 is biasing the door 288a to close. Accordingly, the door 288a will close without further urging by the pin 56. Thus, the backside of the arcuately shaped door face component 366 now contacts the pin 56 due to the spring 386 now urging the door 288a closed. Moreover, note that the pin 56 is now fully within the recess 410. However, note that since both the pin 56 and the hook subassembly 94 extend substantially from the leader take up reel 270a to the leader take up reel 270b, the pin and hook subassembly extend outside of the tape winding core 280 in the direction of the axis 354 (FIG. 16).

Figure 19G:
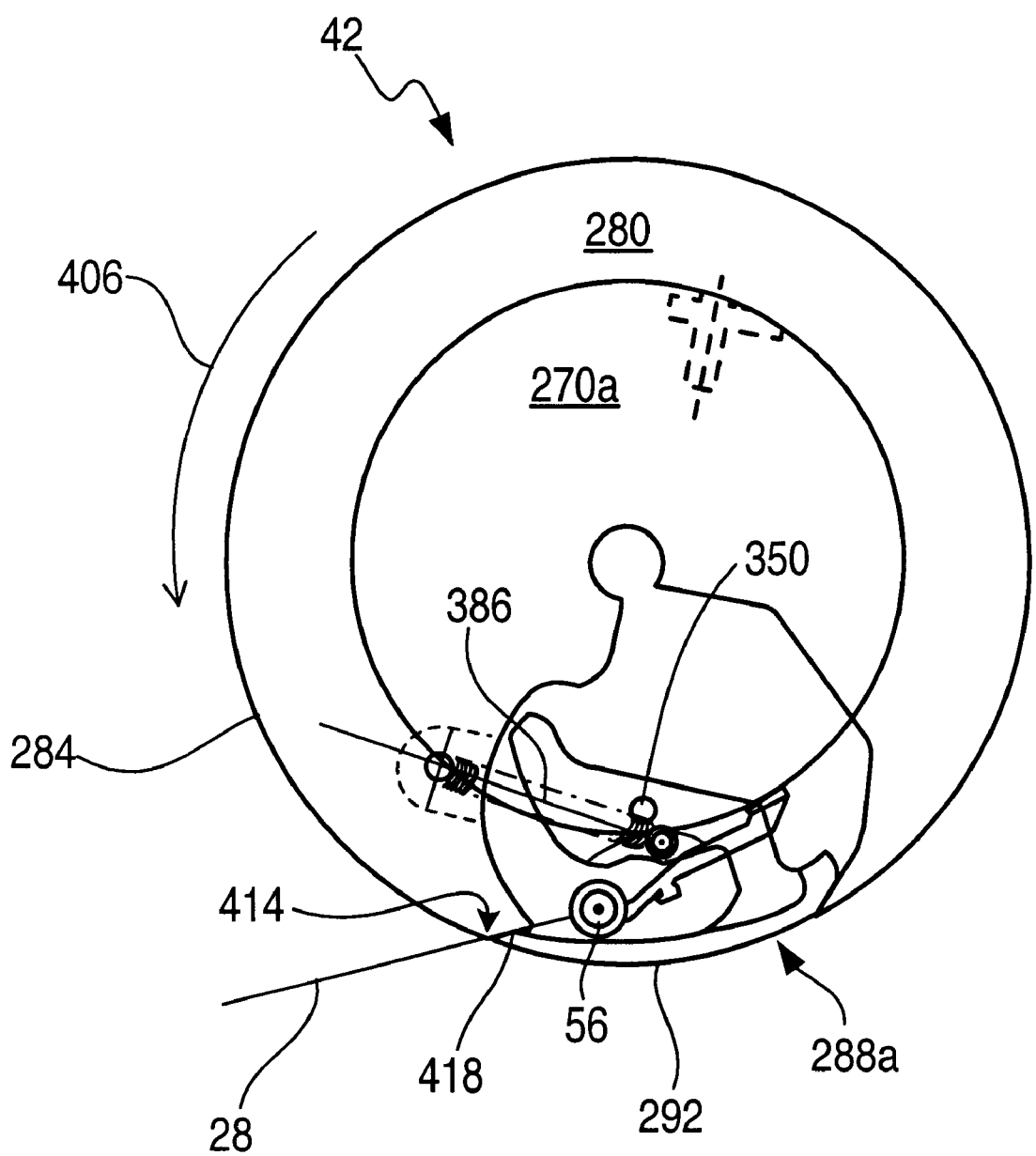

In FIG. 19G, the door 288a is shown fully closed. Accordingly, the tape 28 now extends:

(a) from the pin 56 within the interior of the cylindrical tape winding surface provided by the combination surfaces 284 and 292, (b) through the tape exit 414, which may be no more than a mating of the end 418 of the door 288a with the tape winding core 280, and (c) to the exterior of the take up reel hub 42.

Note that the tape 28 now commences to wind around the circumferential combinations of arcuate surfaces 284 and 292.

When the tape 28 is being unwound from the take up reel hub 42 and the tape is to be unthreaded from the tape drive 20, the illustrations of FIGS. 19A–19G occur in reverse order. However, note that the tension on the tape itself during the unwinding process is now used to urge the door 288a open and thereby overcome the door closing bias of the spring 386. Thus, as the take up reel hub 42 rotates in the clockwise direction for unwinding the tape, the tape 28 causes the door 288a to rotate counterclockwise about the pivot shafts 350, and the pin and hook subassembly are released from the interior of the tape winding core 280.

The foregoing discussion of the invention has been presented for purposes of illustration and description. Further, the description is not intended to limit the invention to the form disclosed herein. Consequently, variation and modification commensurate with the above teachings, and within the skill and knowledge of the relevant art, are within the scope of the present invention. The embodiments described hereinabove are further intended to explain the best modes presently known of practicing the invention and to enable others skilled in the art to utilize the invention as such, or in other embodiments and with the various modifications required by their particular application or uses of the invention. It is intended that the appended claims be construed to include alternative embodiments to the extent permitted by the prior art.

What is claimed is:

1. A take up assembly for data storage tape in combination with a leader assembly, comprising:
   a take up reel hub comprising an annular member that includes a tape winding core with a gap and a door mechanism connected to said tape winding core at said gap, said door mechanism having an open position and a closed position, each of said door mechanism and said tape winding core having an arcuate surface and, when said door mechanism is in said closed position, said arcuate surfaces together define a substantially continuous circumferential surface;
   first and second take up reels connected to said take up reel hub, said first take up reel being spaced from said second take up reel; and
   a leader assembly including a first leader band and a second leader band, said first leader band being positionable about said first take up reel and said second leader band being positionable about said second take up reel.

2. A take up assembly, as claimed in claim 1, wherein:
   substantially all of said gap is filled by said arcuate surface of said door mechanism when said door mechanism is in said closed position.

3. A take up assembly, as claimed in claim 1, wherein:
   said take up reel hub includes a biasing member connected to said door mechanism that biases said door mechanism in said open position.

4. A take up assembly, as claimed in claim 1, wherein:
   said tape winding core includes a ledge adjacent to said gap that can receive a tape pin connected to the data storage tape.

5. A take up assembly, as claimed in claim 1, wherein:
   said take up reel hub is located between said first and second take up reels.

6. A method for wrapping data storage tape having a tape pin connected thereto using a take up assembly and a leader assembly having at least a first leader band, comprising:
   causing at least said first leader band to be wrapped using said take up assembly;
   receiving said tape pin by a take up reel hub of said take up assembly, said take up reel hub including a tape winding core with an outer surface and said receiving step being conducted while a door mechanism having an outer surface of said take up reel hub is in an open position; and
   wrapping said data storage tape using said take up reel hub after said receiving step, said wrapping step including changing said door mechanism from said open position to a closed position without said data storage tape contacting said outer surface of said door mechanism.

7. A method, as claimed in claim 6, wherein:
   said receiving step includes receiving said tape pin adjacent to a ledge formed in a tape winding core of said take up reel hub.

8. A method, as claimed in claim 6, wherein:
   said outer surface of said tape winding core of said take up reel hub is an arcuate surface.

9. A method, as claimed in claim 8, wherein:
   said outer surface of said door mechanism has an arcuate surface and when in said closed position, said door mechanism arcuate surface is substantially continuous with said arcuate surface of said tape winding core.

10. A method, as claimed in claim 6, wherein:
    said causing step includes wrapping said first leader band about a first take up reel spaced from said take up reel hub and said wrapping step includes wrapping said data storage tape such that said data storage tape does not contact said first leader band.

11. A method, as claimed in claim 6, wherein:
    said leader band assembly includes a hook subassembly and said receiving step includes receiving said tape pin adjacent to a ledge of said take up reel hub while said hook subassembly is joined to said tape pin.

12. A tape system, comprising:
    a tape load/unload control mechanism;
    a leader assembly operatively associated with said tape load/unload control mechanism, said leader assembly including at least a first leader band having a first end and a second end; and
    a take up assembly including a take up reel hub having a tape winding core defining an open area and a door mechanism pivotally connected to said tape winding core, said tape winding core having an arcuate surface, said door mechanism having an arcuate surface and including an open position in which said arcuate surface of said door mechanism is positioned inwardly of said tape winding core arcuate surface.

13. A tape system, as claimed in claim 12, wherein:

said door mechanism has a closed position, and when said door mechanism is in said closed position, said door mechanism arcuate surface is circumferentially continuous with said tape winding core arcuate surface.

14. A tape system, as claimed in claim 12, further including:

a tape cartridge including data storage tape having an end and a tape pin connected adjacent to said end;

wherein said tape winding core has a ledge disposed inwardly of said arcuate surface and said tape pin is received inwardly of said tape winding core arcuate surface adjacent to said ledge while said door mechanism is in said open position.

15. A tape system, as claimed in claim 12, wherein:

said take up assembly includes at least a first take up reel spaced from said take up reel hub, said first take up reel having said first leader band wrapped thereabout.

16. A tape system, as claimed in claim 15, wherein:

said leader assembly includes a second leader band and said take up assembly includes a second take up reel and in which said take up reel hub is located between said first and second take up reels.

17. A tape system, as claimed in claim 12, further including:

a tape cartridge including data storage tape having an end and a tape pin connected adjacent to said end;

wherein said tape winding core has a ledge disposed inwardly of said arcuate surface and said leader assembly includes a hook subassembly connected to said second end of said first leader band, said hook subassembly being joined to said tape pin and wherein, when said tape pin is held adjacent to said ledge, said hook subassembly remains joined to said tape pin.

18. A tape system, as claimed in claim 17, wherein:

said leader assembly includes a second leader band having a first and second ends, said second end being connected to said hook subassembly, said take up assembly also including a second take up reel and, when said first and second leader bands are wrapped about said first and second take up reels, respectively, said tape pin is joined to said hook subassembly and held in said tape winding core adjacent to said ledge.

19. A tape system, as claimed in claim 12, further including:

a tape cartridge including data storage tape;

wherein said door mechanism has an arcuate surface and a closed position and when said door mechanism is moved from said open position to said closed position, said door mechanism arcuate surface is free of contact with said data storage tape.

\* \* \* \* \*